US011896106B2

(12) United States Patent
Ko et al.

(10) Patent No.: US 11,896,106 B2
(45) Date of Patent: Feb. 13, 2024

(54) LED NAIL DRYER

(71) Applicant: Codi N Codi, Inc.

(72) Inventors: Daniel Ko, College Point, NY (US); Boksung Moon, Seoul (KR)

( * ) Notice: Subject to any disclaimer, the term of this patent is extended or adjusted under 35 U.S.C. 154(b) by 543 days.

(21) Appl. No.: 16/359,820

(22) Filed: Mar. 20, 2019

(65) Prior Publication Data

US 2020/0008554 A1 Jan. 9, 2020

(51) Int. Cl.

| | |
|---|---|
| ***A45D 29/00*** | (2006.01) |
| ***F21V 7/04*** | (2006.01) |
| ***F21V 33/00*** | (2006.01) |
| ***F21V 17/12*** | (2006.01) |
| *F21Y 115/10* | (2016.01) |

(52) U.S. Cl.

CPC ................ *A45D 29/00* (2013.01); *F21V 7/04* (2013.01); *F21V 17/12* (2013.01); *F21V 33/008* (2013.01); *F21Y 2115/10* (2016.08)

(58) Field of Classification Search

CPC .............. A45D 29/00; A45D 2200/205; A45D 2029/008; F21V 7/04; F21V 17/12; F21V 33/008; F21Y 2115/10

See application file for complete search history.

(56) References Cited

U.S. PATENT DOCUMENTS 4,100,415 A * 7/1978 Blaisdell .............. A61N 5/0614 250/455.11
4,988,883 A * 1/1991 Oppawsky ............. A45D 29/18 250/455.11
5,351,417 A * 10/1994 Rubin ..................... D06F 58/00 34/90
7,100,620 B2 * 9/2006 Fung ...................... A45D 29/20 132/73.5
7,712,473 B1 * 5/2010 Robinson ............... A45D 29/00 132/73
8,242,475 B1 * 8/2012 Cheng .................... A45D 31/00 250/504 R
8,993,983 B2 * 3/2015 Li ............................ F26B 9/00 250/455.11
D734,548 S * 7/2015 Dadon ........................... D28/58
9,351,555 B2 * 5/2016 Li ............................ G21K 5/08
9,578,947 B2 * 2/2017 Wan ....................... A45D 29/00
D785,870 S * 5/2017 Dadon ........................... D28/58
9,707,537 B2 * 7/2017 Haile ...................... A45D 29/00
9,713,371 B1 * 7/2017 Luu ........................ A45D 29/00
9,855,543 B2 * 1/2018 Haile ..................... B01J 19/123
10,524,554 B2 * 1/2020 Hsieh .................. H01M 50/213
D900,396 S * 10/2020 Zhang ............................ D28/58
10,955,190 B2 * 3/2021 Hsieh ...................... F26B 9/003
(Continued)

*Primary Examiner* — Nicholas D Lucchesi
(74) *Attorney, Agent, or Firm* — ANTONIO HA & U.S. PATENT, LLC

(57) ABSTRACT

According to an embodiment, a light emitting diode (LED) nail dryer comprises a cover having a front surface and a rear surface, the rear surface having a rear opening, a bottom plate coupled with the cover and having a bottom opening extending to the rear opening, an internal body formed on the bottom plate in the cover and having a plurality of sockets, and a plurality of LED panels. The plurality of sockets of the internal body may be arranged in a dome shape. Each of the plurality of LED panels may be detachably fitted into a respective one of the plurality of sockets via at least one magnet or at least one fitting structure.

14 Claims, 22 Drawing Sheets

(56) References Cited

U.S. PATENT DOCUMENTS

| | | | | |
|---|---|---|---|---|
| D926,379 | S * | 7/2021 | Wu | D28/58 |
| 2003/0189835 | A1* | 10/2003 | Tsukamoto | B62J 6/02<br>362/475 |
| 2004/0065336 | A1* | 4/2004 | Fung | A45D 44/02<br>132/73.5 |
| 2010/0067227 | A1* | 3/2010 | Budike | F21V 29/507<br>362/235 |
| 2011/0036997 | A1* | 2/2011 | Lai | A45D 31/00<br>250/492.1 |
| 2011/0277338 | A1* | 11/2011 | Li | G21K 5/08<br>34/275 |
| 2013/0020509 | A1* | 1/2013 | Horvath | A45D 29/00<br>250/492.1 |
| 2014/0153245 | A1* | 6/2014 | Horvath | H05K 1/0203<br>362/249.06 |
| 2014/0237845 | A1* | 8/2014 | Llim | A45D 29/00<br>34/275 |
| 2018/0249054 | A1* | 8/2018 | Chien | H04N 5/2257 |
| 2020/0109895 | A1* | 4/2020 | Hsieh | F26B 3/28 |

* cited by examiner

LED NAIL DRYER

CROSS-REFERENCE TO RELATED APPLICATIONS

This patent application claims priority under 35 U.S.C. § 119 to Chinese Patent Applications Nos. 201821075488.4, filed on Jul. 9, 2018, and 201920323146.8, filed on Mar. 14, 2019 in the China National Intellectual Property Administration (CNIPA), the disclosures of which are incorporated by reference herein in their entireties.

TECHNICAL FIELD

Embodiments of the disclosure relate to an LED nail dryer and, more specifically to, an LED nail dryer with replaceable LED panels.

DISCUSSION OF RELATED ART

Many ladies like to wear nail polish on their nails and more particularly finger nails for aesthetic reasons. However, it takes a long time for the nail polish to dry in the air naturally. Therefore, a lady has to waste considerable time waiting for the nail polish on her nails to dry. To avoid such waste of time, some nail dryers have been devised to expedite drying of the nail polish on nails.

Sometimes, ladies dry nail polish on their nails with a hair dryer. Use of the hair dryer to dry the nail polish requires some skills. If the hair dryer is positioned too far from the nail polish, a small portion of hot air sent from the hair dryer can contribute to the drying of the nail polish. If the hair dryer is positioned too close to the nail polish, the nail polish will be wrinkled by strong air sent from the hair dryer.

For nail drying purposes alone, there are known compact nail dryers. A conventional nail dryer adopts a light source that can emit light is installed in the casing, shining on the user's finger nails to cure the nail polish. Such a nail dryer adopts light emitting diode (LED) lamps as light sources.

Due to limited lifespan, LED lamps require replacement as their radiations are not strong enough to provide results as expected. However, it is not easy to replace only LED lamps, and the user may need to get a new one.

SUMMARY

According to an embodiment, a light emitting diode (LED) nail dryer comprises a cover having a front surface and a rear surface, the rear surface having a rear opening, a bottom plate coupled with the cover and having a bottom opening extending to the rear opening, an internal body formed on the bottom plate in the cover and having a plurality of sockets, and a plurality of LED panels. The plurality of sockets of the internal body may be arranged in a dome shape. Each of the plurality of LED panels may be detachably fitted into a respective one of the plurality of sockets via at least one magnet or at least one fitting structure.

A control panel may be attached onto the front surface of the cover.

The control panel may include a display and at least one control button.

Each of the plurality of LED panels may have at least one concave mirror plate. At least one LED may be disposed in a center of each concave mirror plate.

The internal body may include a top part and a plurality of side parts extending from the top part. One of the side parts may include an opening corresponding to the rear opening of the cover. The plurality of sockets may be formed in the plurality of side parts.

Each of the plurality of sockets may include at least one slots.

At least one of the plurality of sockets may include at least one magnet receiving part on a bottom thereof and the at least one magnet seated on the at least one magnet receiving part. A socket board may be provided to cover the at least one magnet and is fastened to the bottom of the at least one socket via at least one screw.

Each of the plurality of sockets may have a space to receive, or allow to be fitted thereto, a corresponding one of the plurality of LED panels.

Each of the plurality of sockets may be sized, dimensioned, or shaped to correspond to a corresponding one of the plurality of LED panels.

Each of the plurality of LED panels may include an LED module casing and an LED module board configured to cover the LED module casing.

The LED module board may be fastened to the LED module casing via at least one screw. The LED module casing may include at least one mirror plate receiving hole depressed from a first surface thereof and at least one supporting pole and at least one screw pole projecting from a second surface facing away from the first surface.

An attaching screw may be inserted into each of the at least one supporting pole, and a fastening screw is inserted into each of the at least one screw pole. The attaching screw may stick to a corresponding one of the at least one magnet.

The fitting structure may include a fastening protrusion from a top of the LED module casing fitted and stuck to a slot formed in each of the plurality of sockets.

The fastening screw may connect the LED module board to the LED module casing.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the disclosure will be described in detail with reference to the accompanying drawings. Like reference denotations may be used to refer to the same or similar elements throughout the specification and the drawings. The disclosure, however, may be modified in various different ways, and should not be construed as limited to the embodiments set forth herein. As used herein, the singular forms “a,” “an,” and “the” are intended to include the plural forms as well, unless the context clearly indicates otherwise. It will be understood that when an element or layer is referred to as being “on,” “connected to,” “coupled to,” or “adjacent to” another element or layer, it can be directly on, connected, coupled, or adjacent to the other element or layer, or intervening elements or layers may be present.

Figure 1:
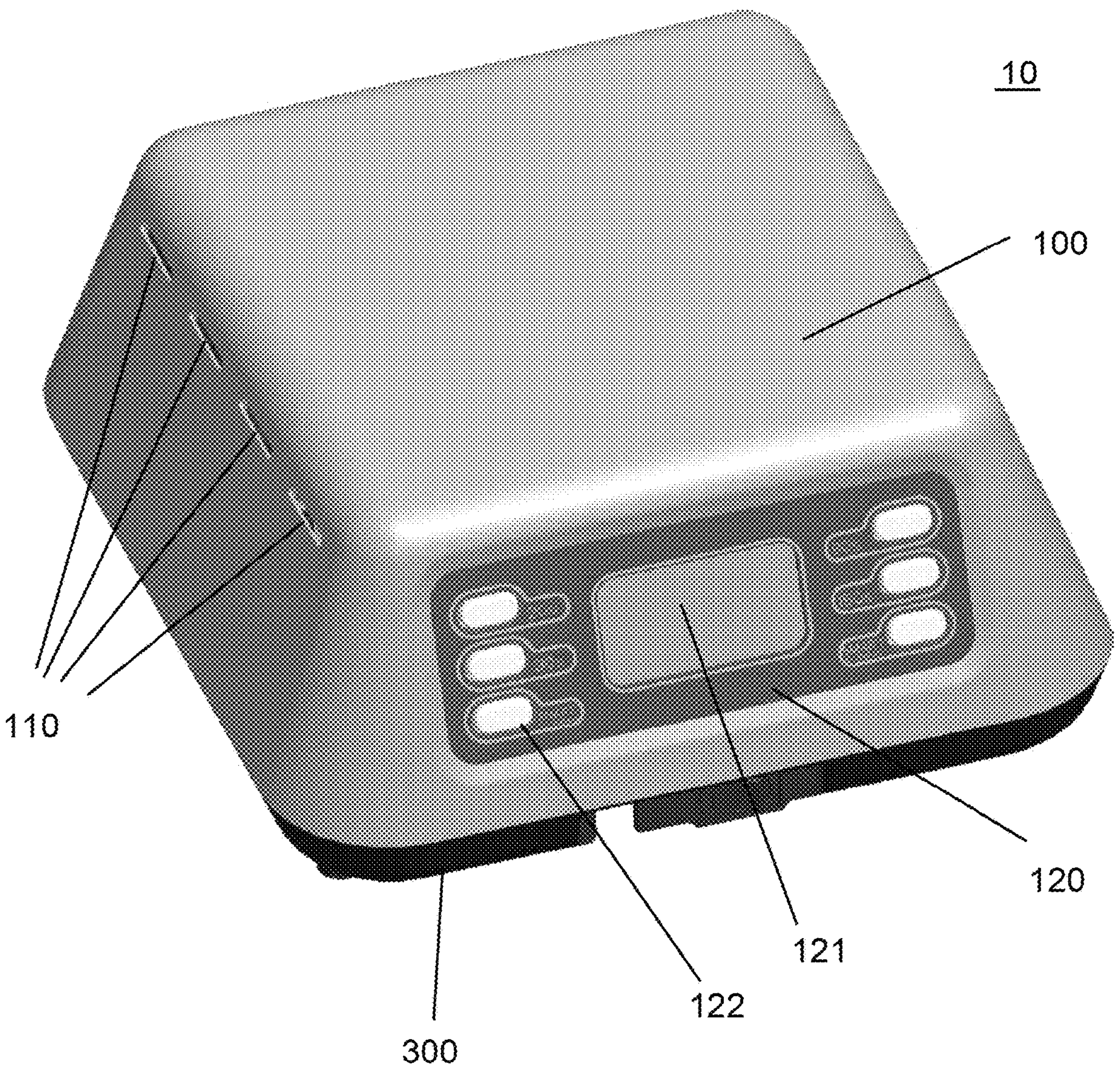
FIG. 1 is a front perspective view illustrating an LED nail dryer according to an embodiment.
Figure 2:
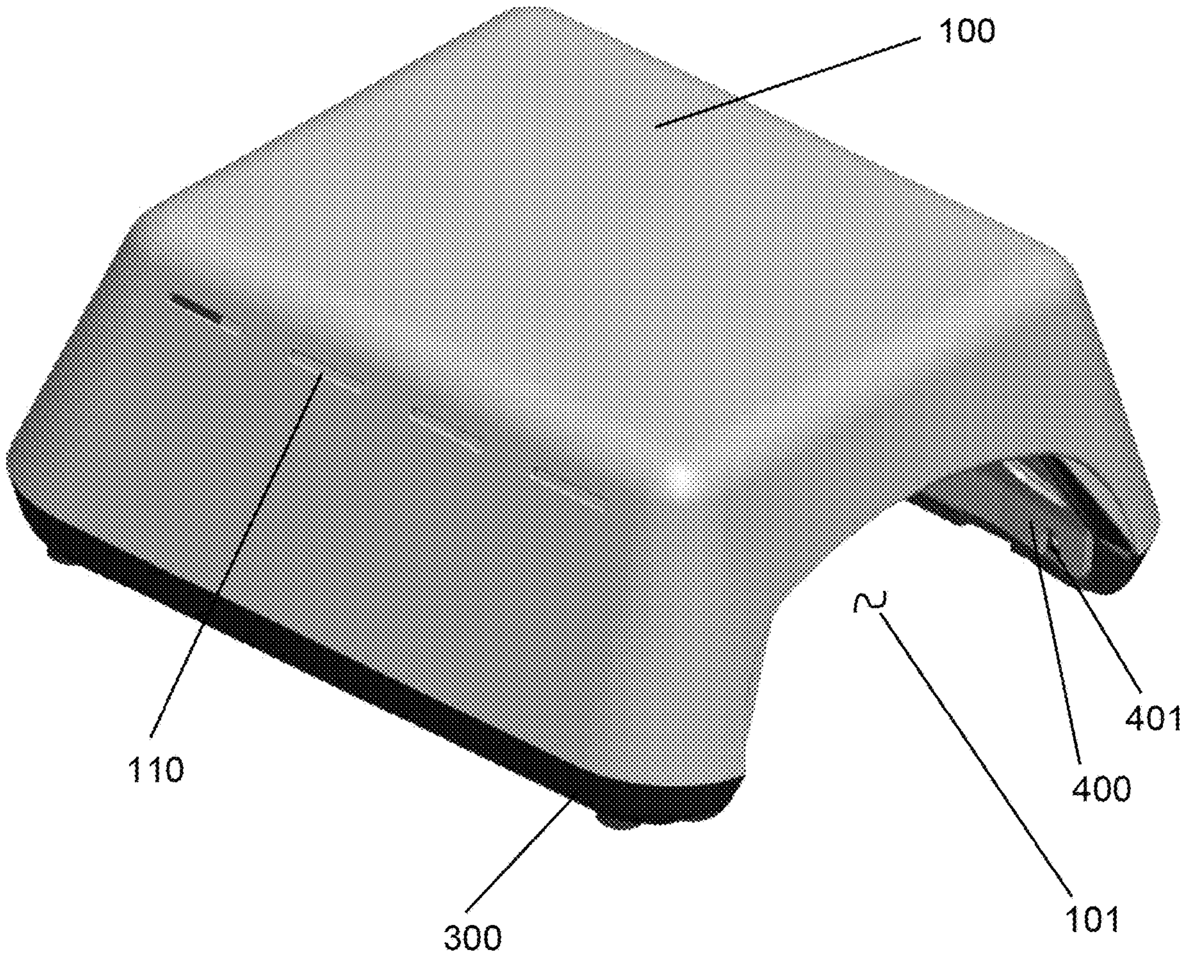
FIG. 2 is a rear perspective view illustrating an LED nail dryer according to an embodiment.
Figure 3:
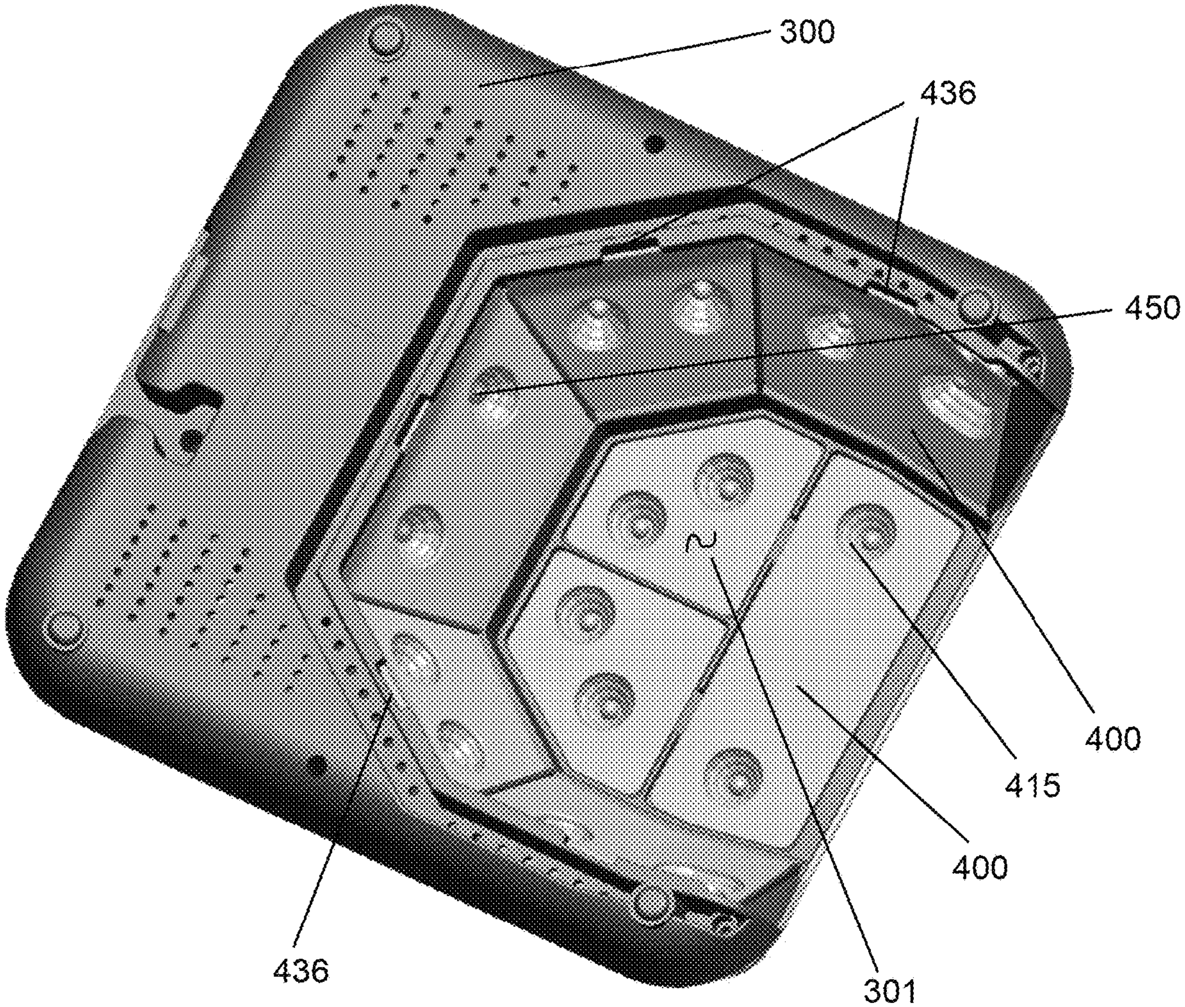
FIG. 3 is a perspective view illustrating an LED nail dryer as viewed from above the bottom thereof, according to an embodiment.
Figure 4:
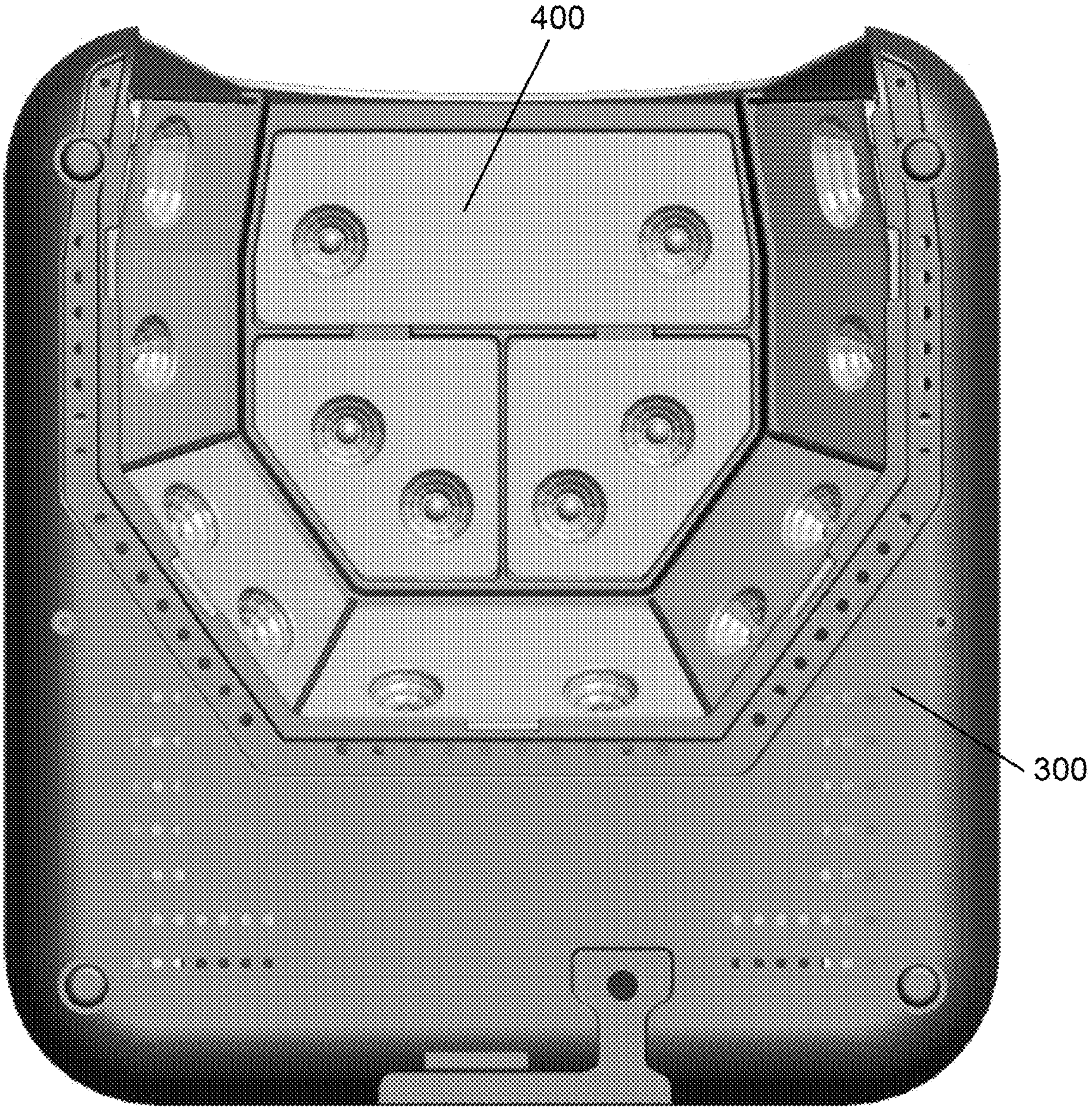
FIG. 4 is a bottom view illustrating an LED nail dryer according to an embodiment.
Figure 5:
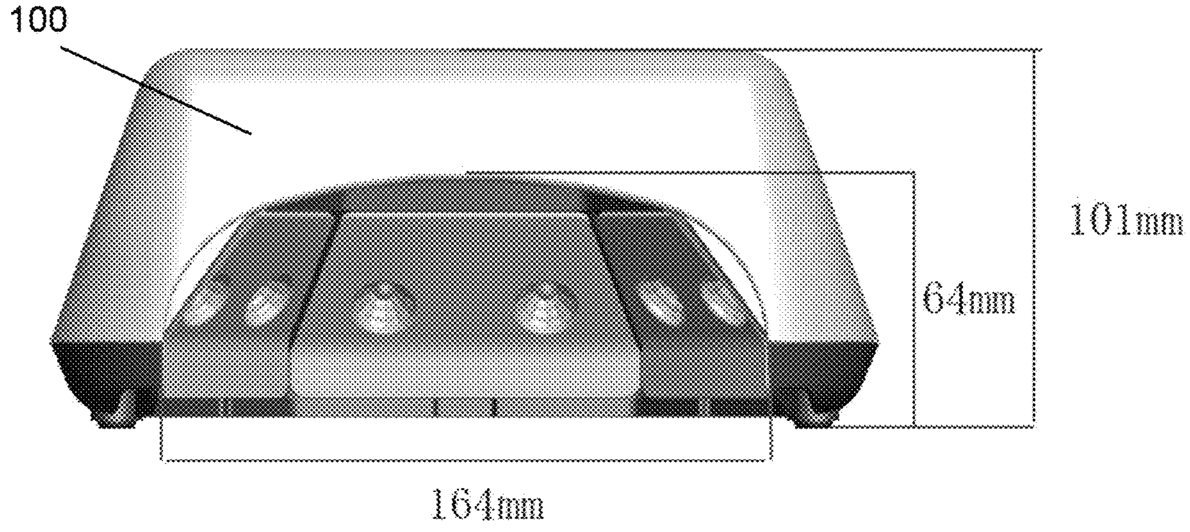
FIG. 5 is a rear view illustrating an LED nail dryer according to an embodiment.
Figure 6:
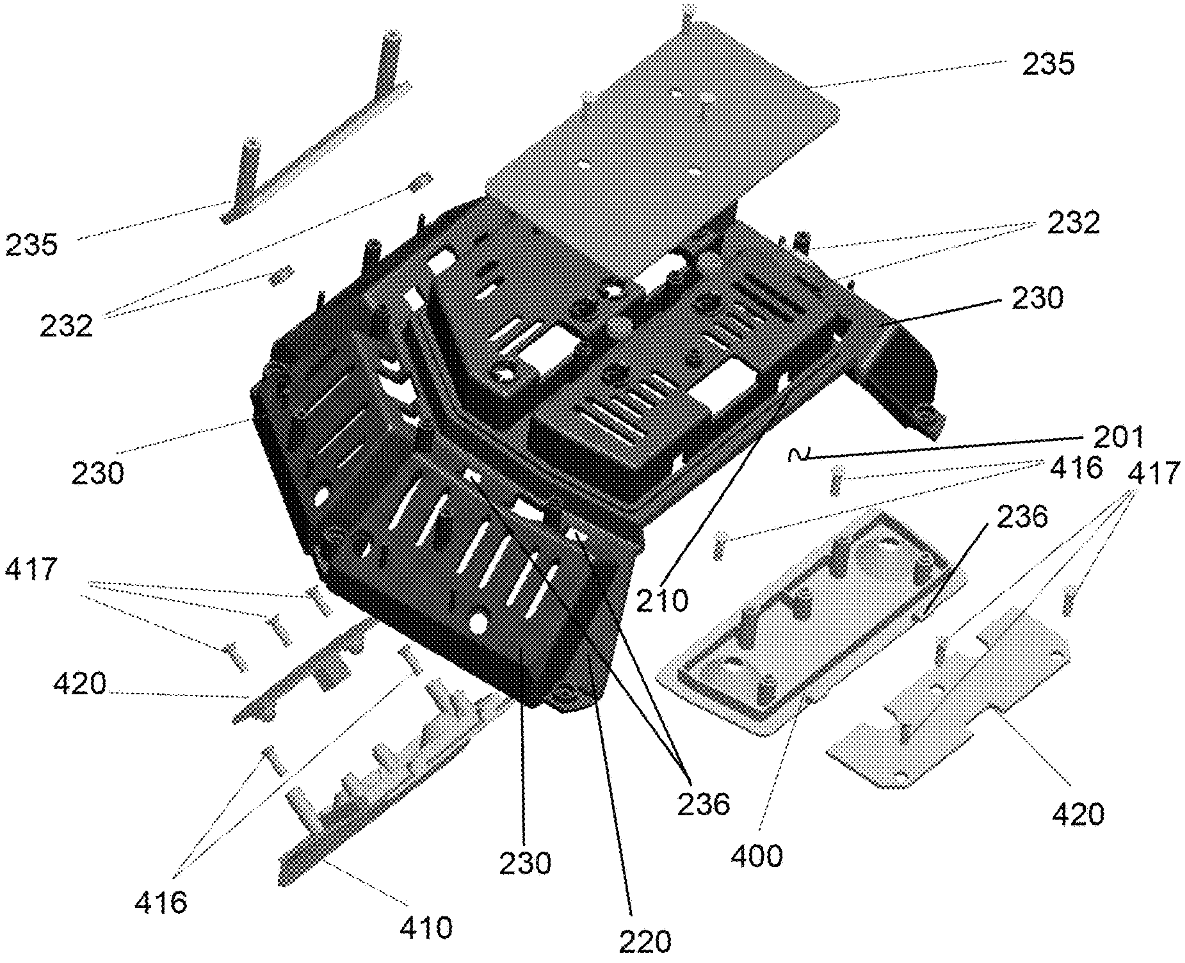
FIG. 6 is an exploded perspective view illustrating an internal body and LED panels of an LED nail dryer according to an embodiment.
Figure 7:
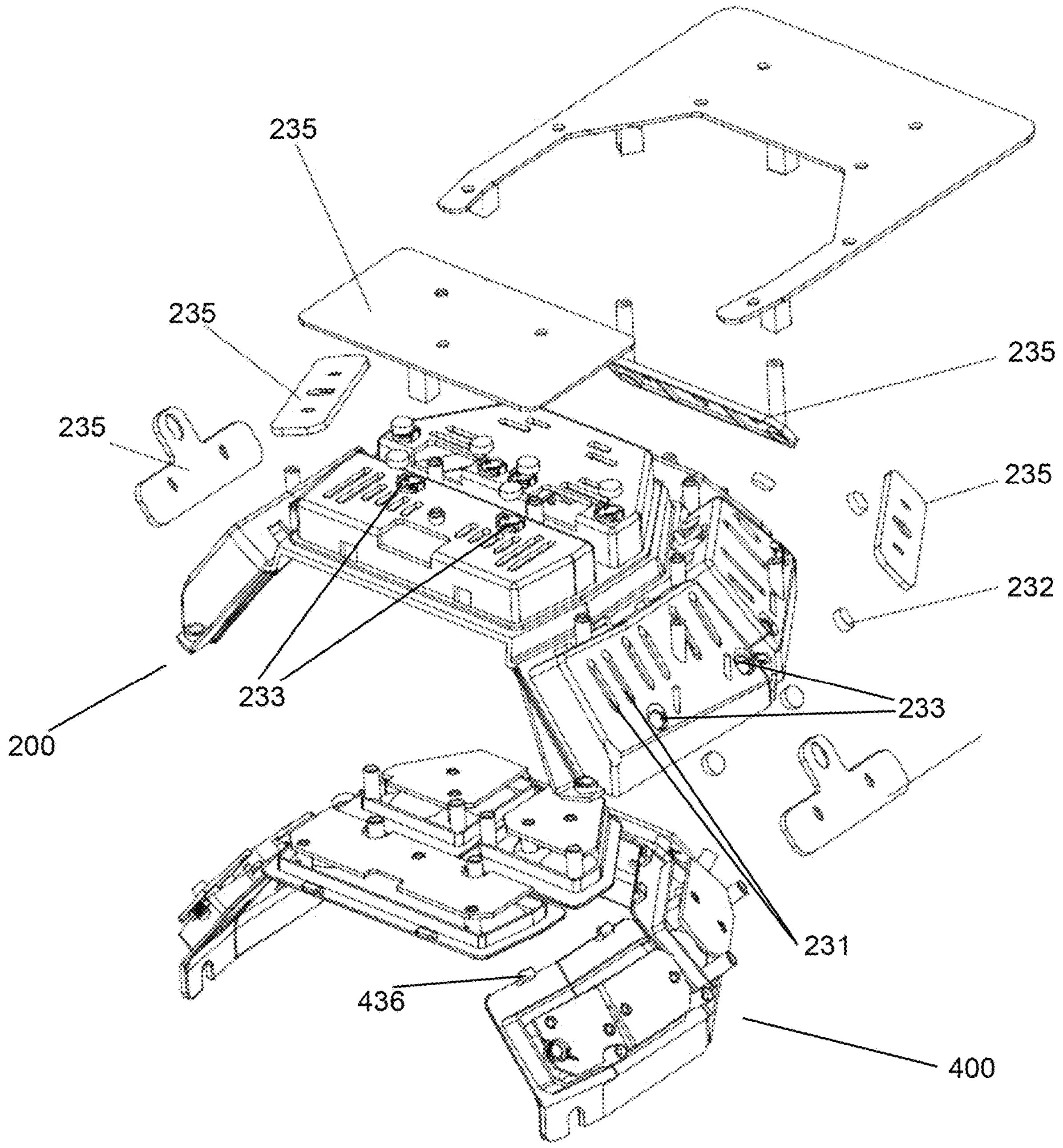
FIG. 7 is an exploded perspective view illustrating an internal body and LED panels of an LED nail dryer according to an embodiment.
Figure 8:
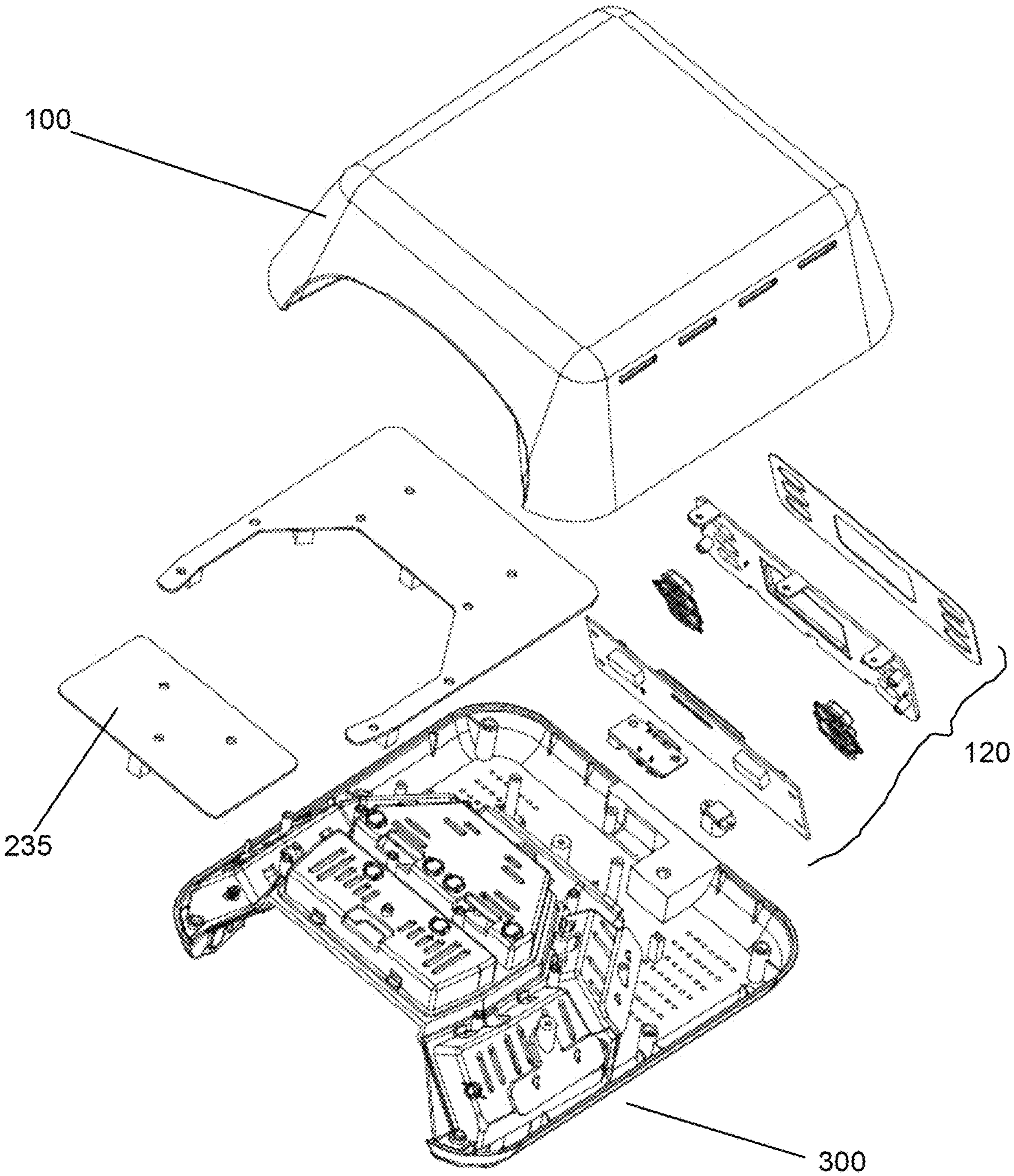
FIG. 8 is an exploded perspective view illustrating an LED nail dryer according to an embodiment.
Figure 9:
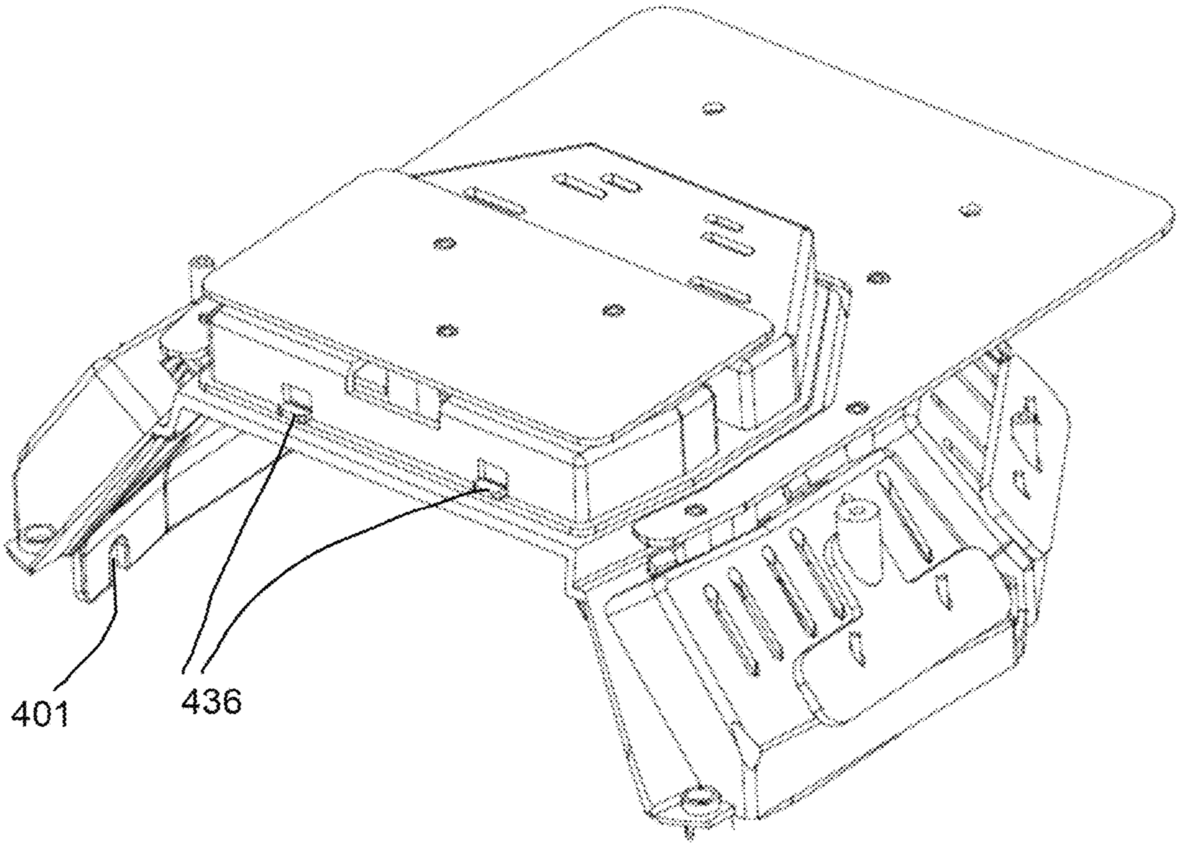
FIG. 9 is a perspective view illustrating an assembly of an internal body and LED panels of an LED nail dryer according to an embodiment.
Figure 10:
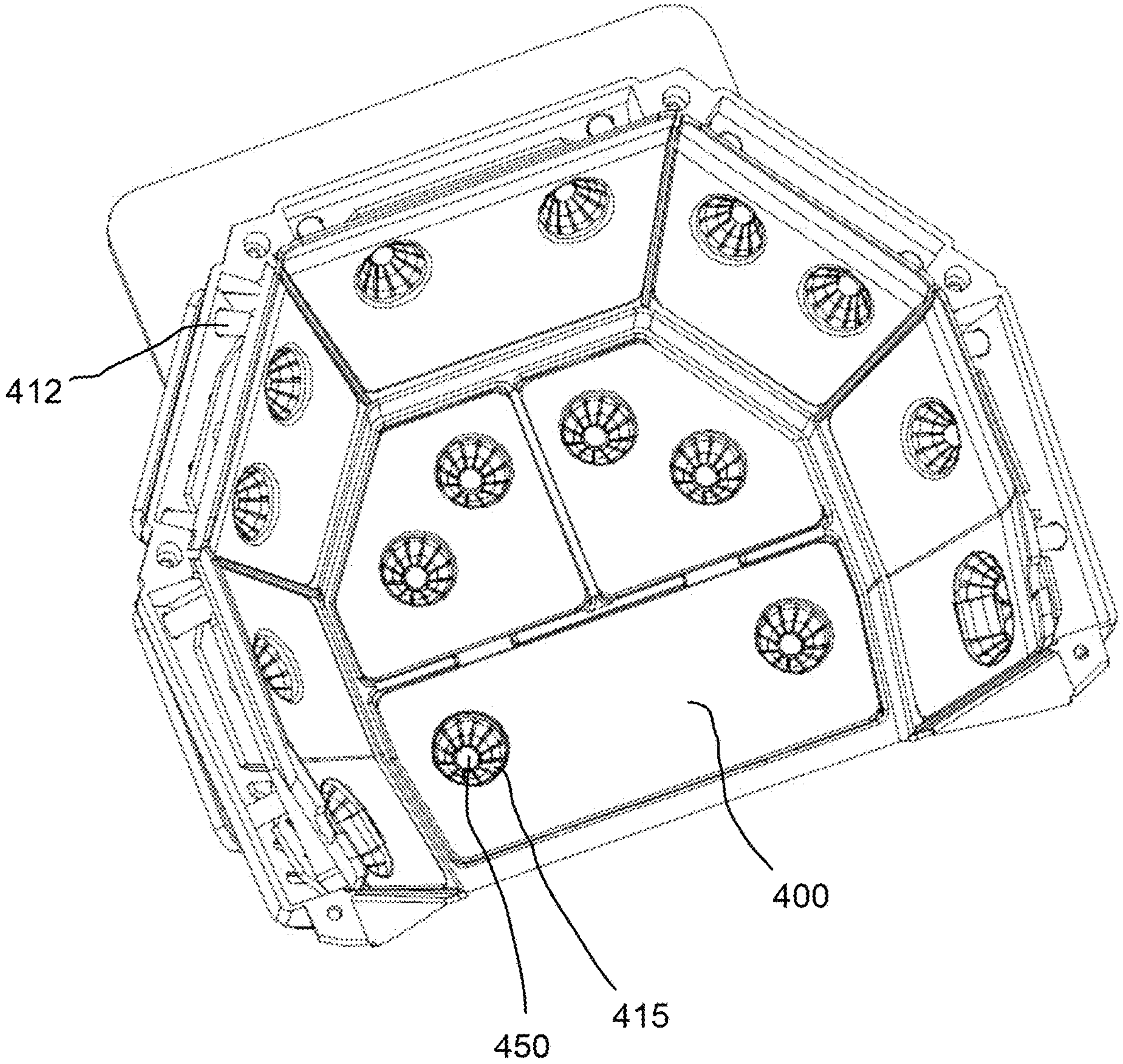
FIG. 10 is a perspective view illustrating the assembly of FIG. 9 as viewed from above the bottom thereof, according to an embodiment.
Figure 11:
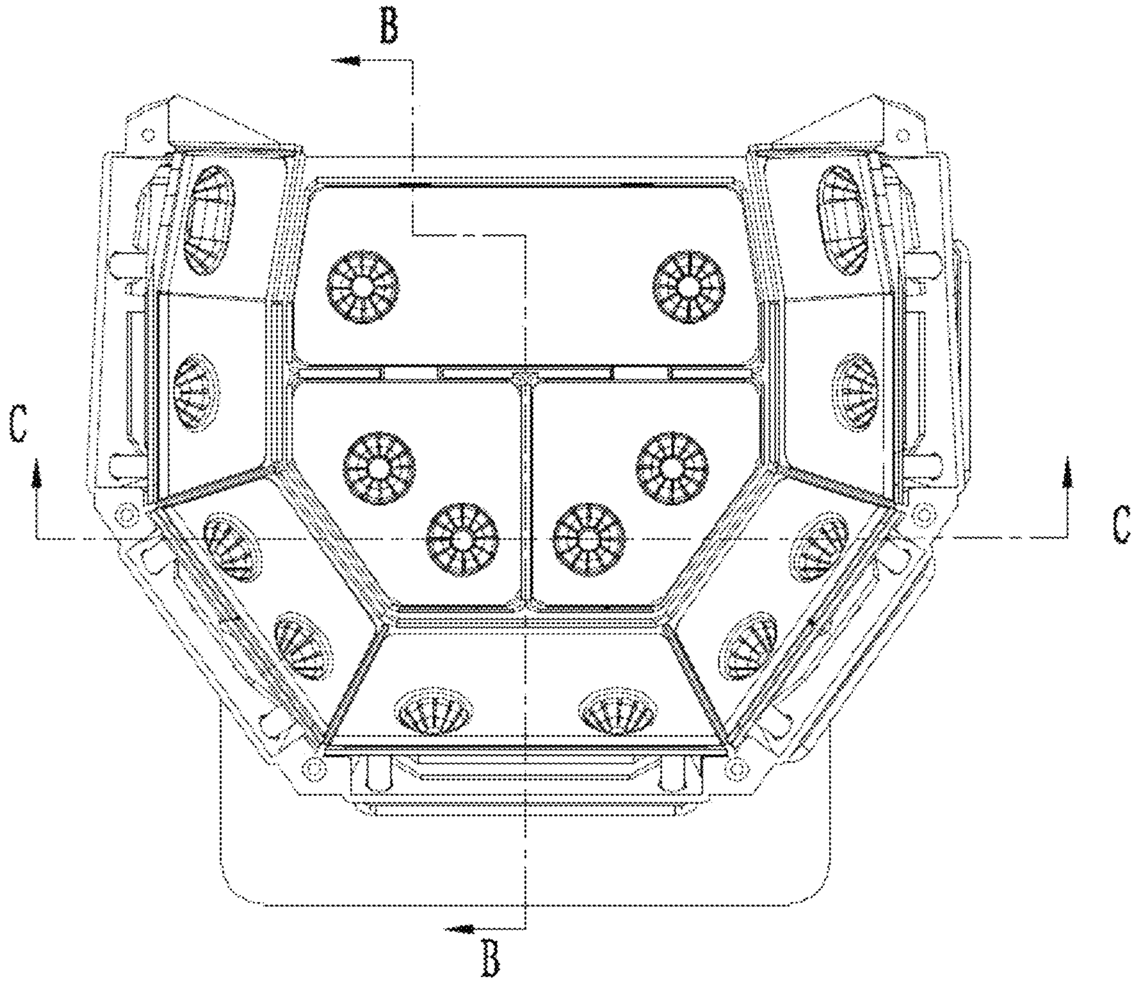
FIG. 11 is a bottom view of the assembly of FIG. 9, according to an embodiment.
Figure 12:
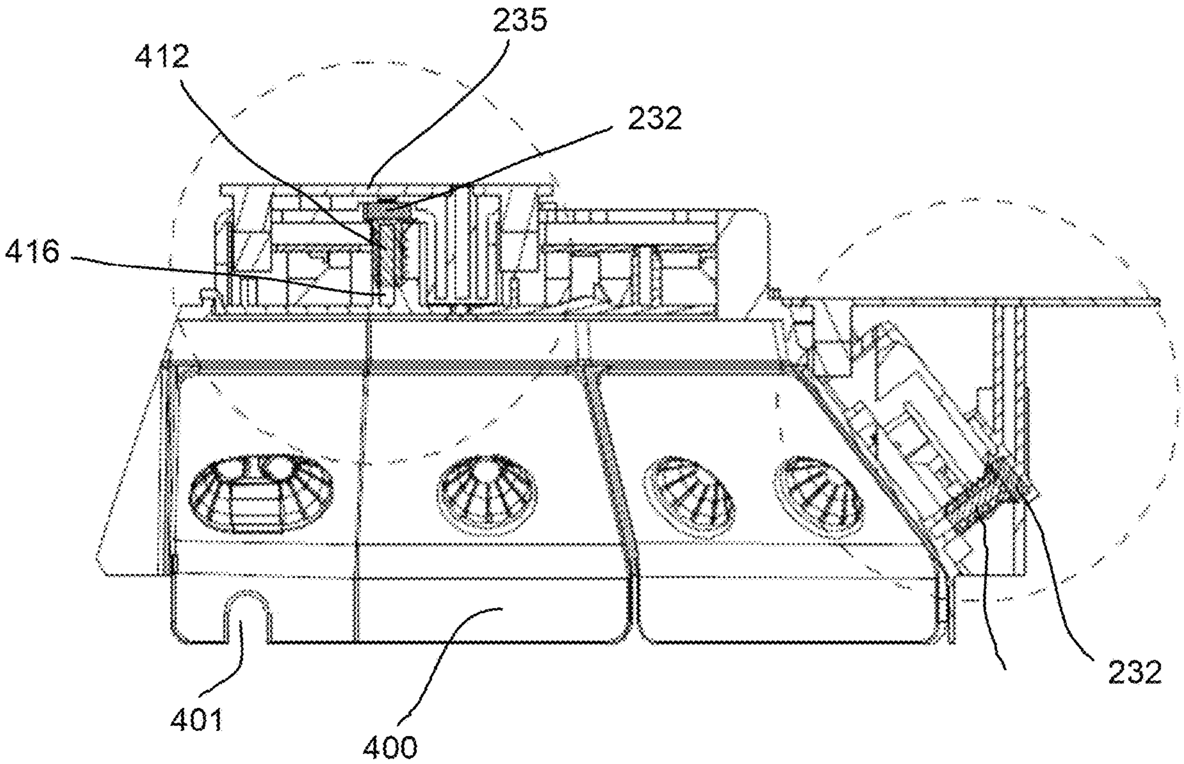
FIG. 12 is a cross-sectional view taken along line B-B of FIG. 11, according to an embodiment.
Figure 13:
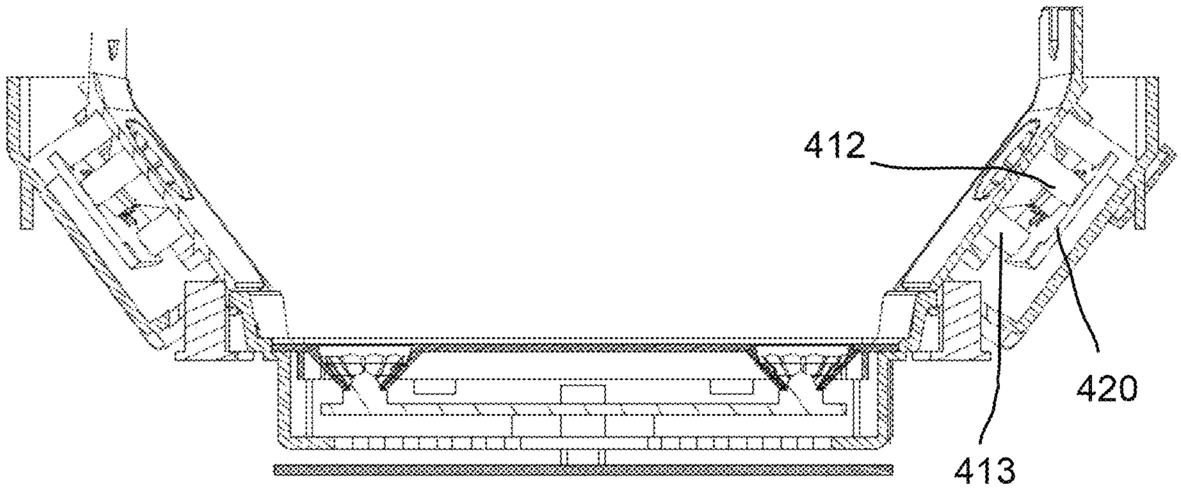
FIG. 13 is a cross-sectional view taken along line C-C of FIG. 11, according to an embodiment.
Figure 14:
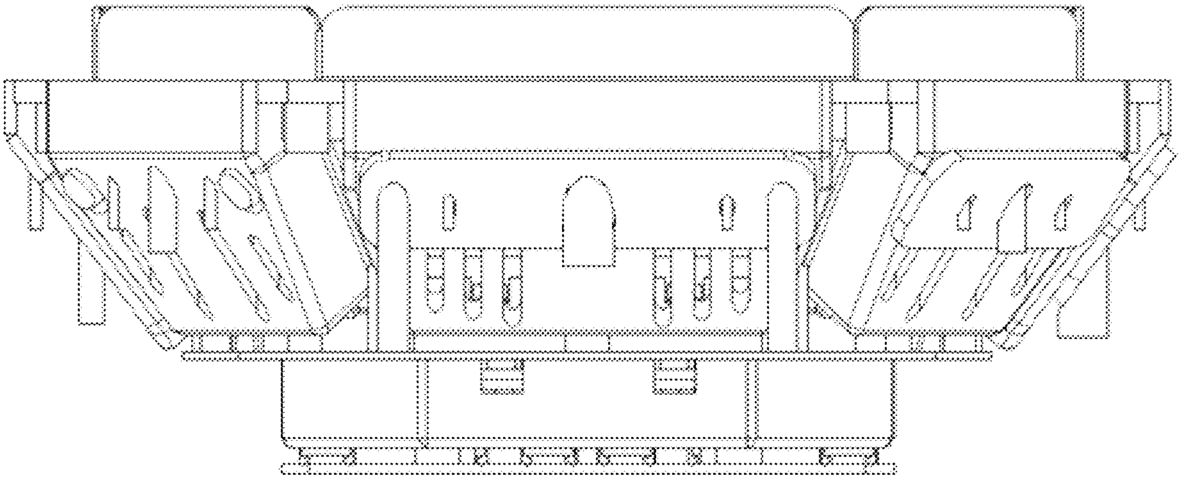
FIG. 14 is a side view illustrating the assembly of FIG. 9, according to an embodiment.
Figure 15:
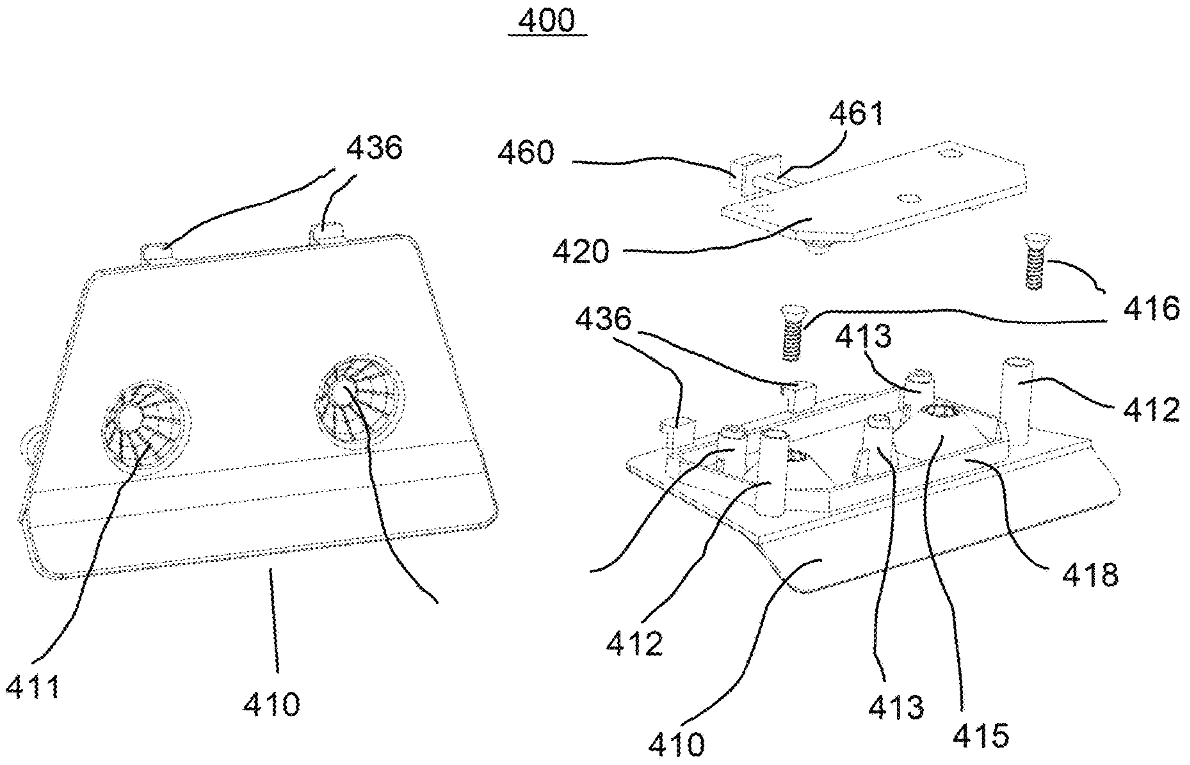
FIG. 15 is an exploded perspective view illustrating a first panel of an LED nail dryer according to an embodiment.
Figure 16:
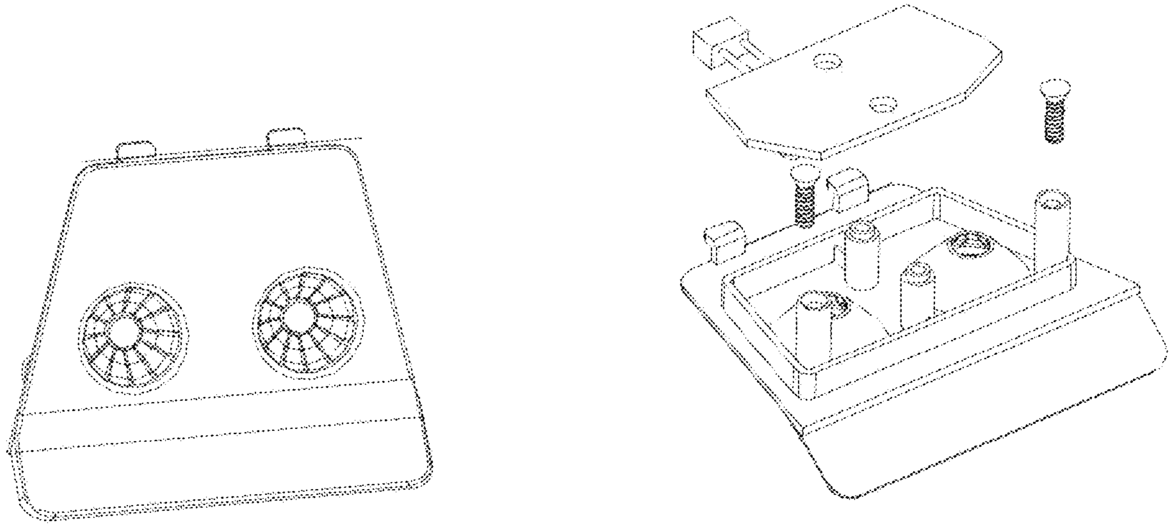
FIG. 16 is an exploded perspective view illustrating a second panel of an LED nail dryer according to an embodiment.
Figure 17:
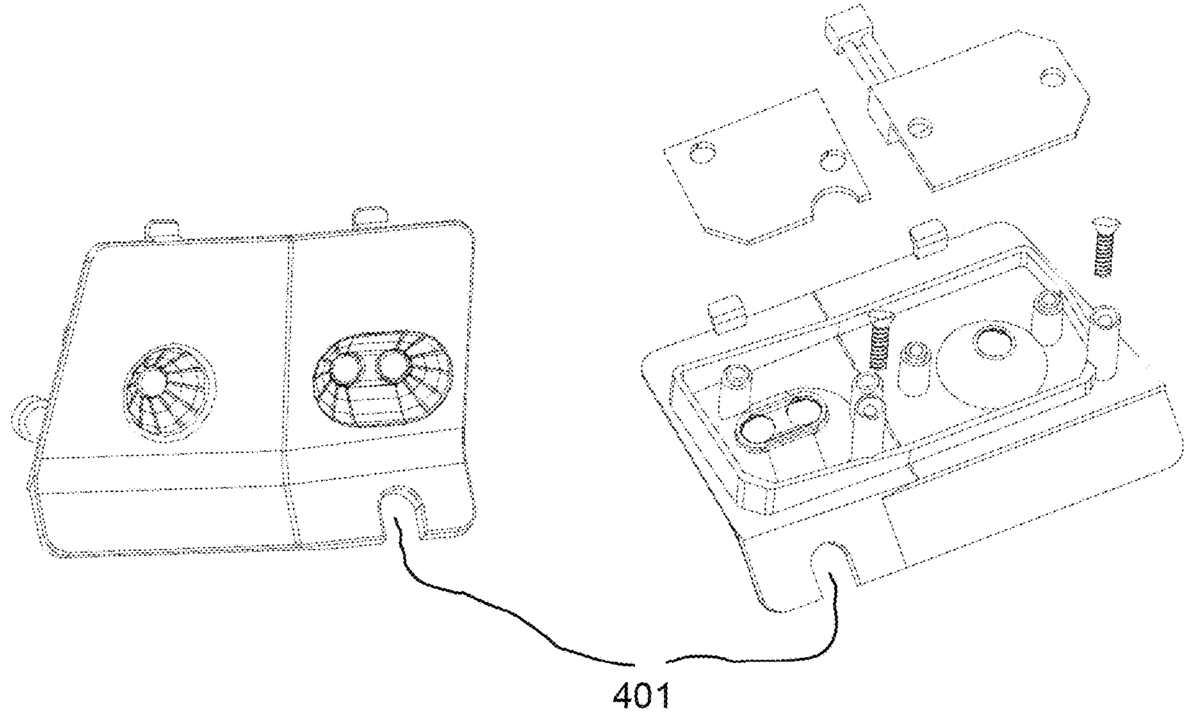
FIG. 17 is an exploded perspective view illustrating a third panel of an LED nail dryer according to an embodiment.
Figure 18:
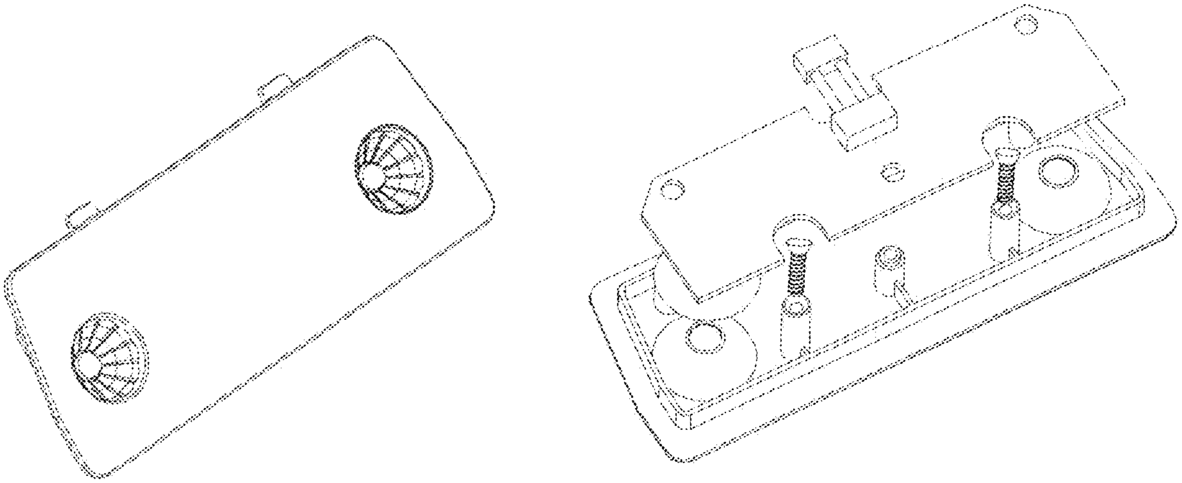
FIG. 18 is an exploded perspective view illustrating a fourth panel of an LED nail dryer according to an embodiment.
Figure 19:
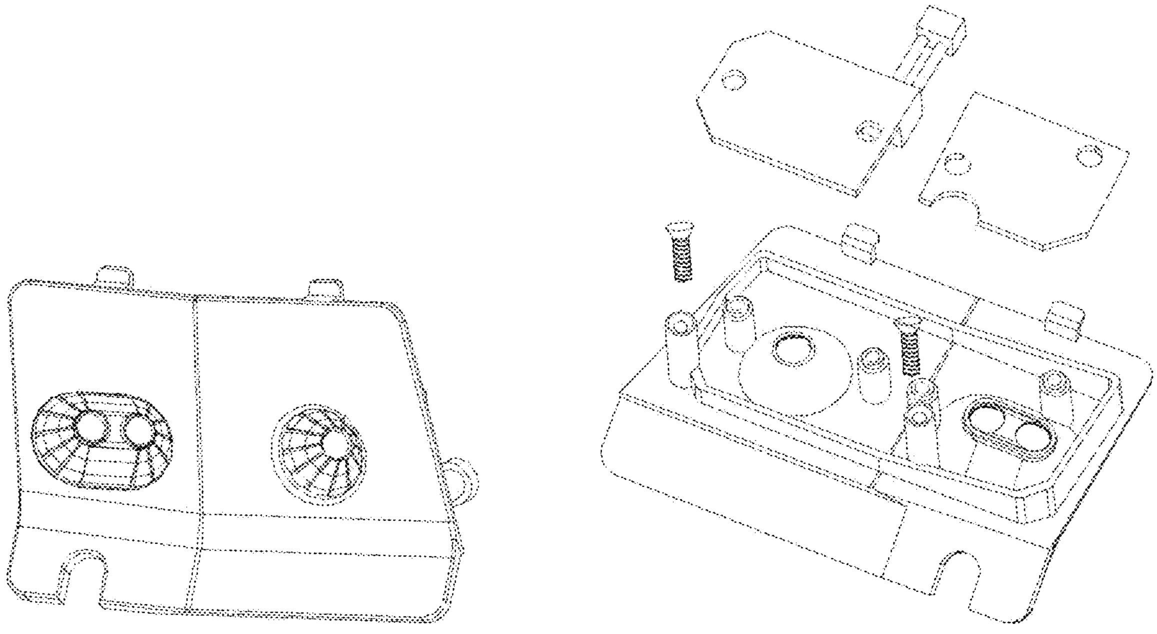
FIG. 19 is an exploded perspective view illustrating a fifth panel of an LED nail dryer according to an embodiment.
Figure 20:
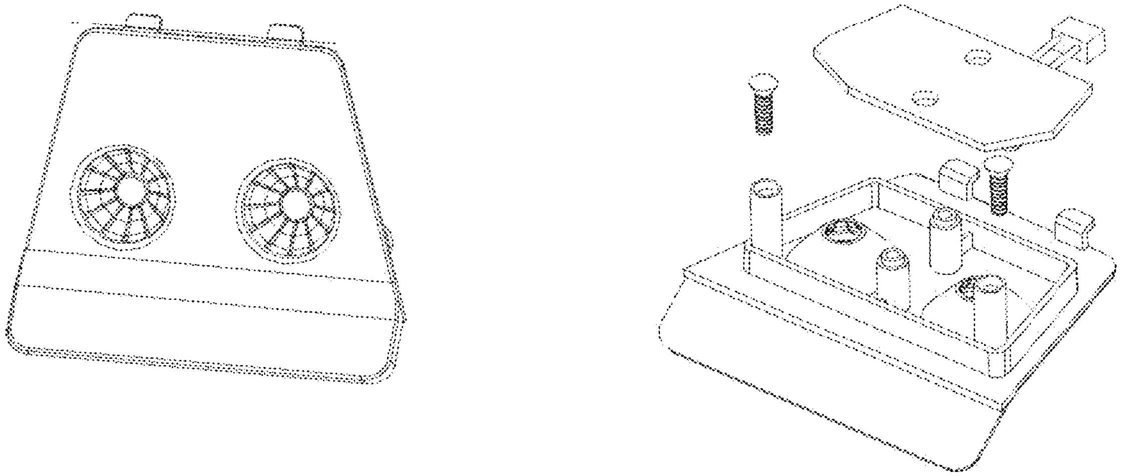
FIG. 20 is an exploded perspective view illustrating a sixth panel of an LED nail dryer according to an embodiment.
Figure 21:
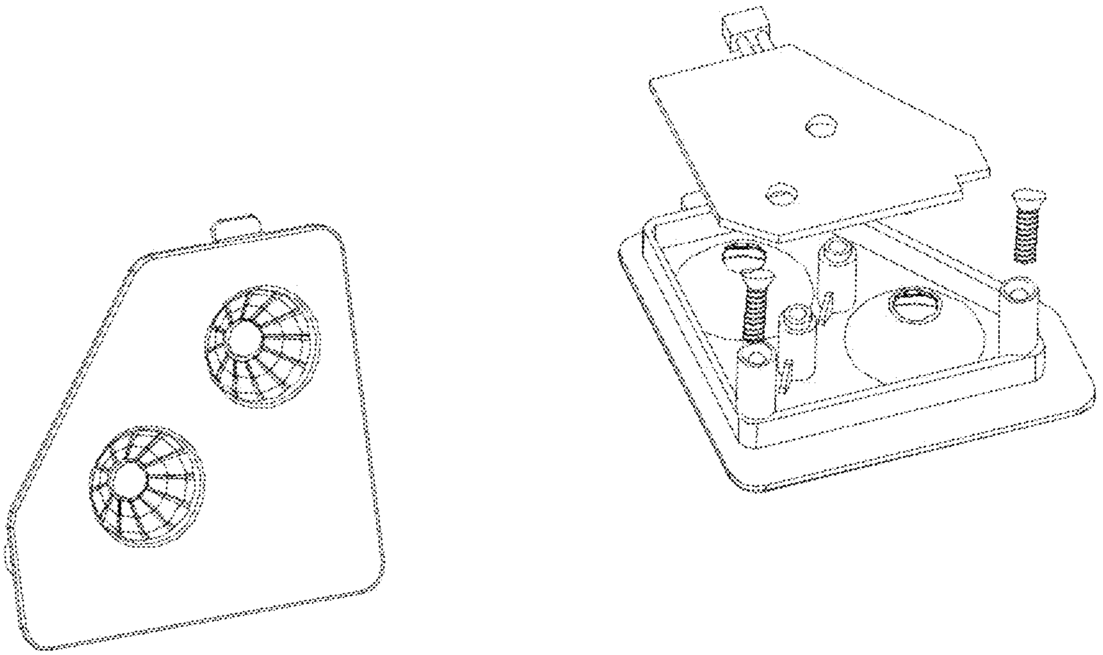
FIG. 21 is an exploded perspective view illustrating a seventh panel of an LED nail dryer according to an embodiment.
Figure 22:
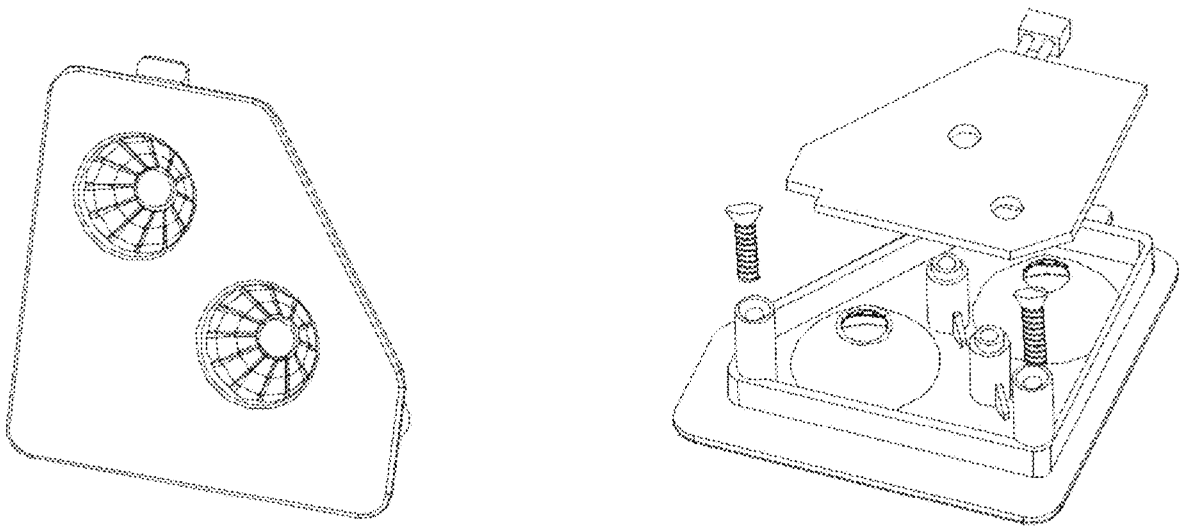
FIG. 22 is an exploded perspective view illustrating an eighth panel of an LED nail dryer according to an embodiment.

FIG. 1 is a front perspective view illustrating an LED nail dryer according to an embodiment. FIG. 2 is a rear perspective view illustrating an LED nail dryer according to an embodiment. FIG. 3 is a perspective view illustrating an LED nail dryer as viewed from above the bottom thereof, according to an embodiment. FIG. 4 is a bottom view illustrating an LED nail dryer according to an embodiment. FIG. 5 is a rear view illustrating an LED nail dryer according to an embodiment. FIG. 6 is an exploded perspective view illustrating an internal body and LED panels of an LED nail dryer according to an embodiment. FIG. 7 is an exploded perspective view illustrating an internal body and LED panels of an LED nail dryer according to an embodiment. FIG. 8 is an exploded perspective view illustrating an LED nail dryer according to an embodiment. FIG. 9 is a perspective view illustrating an assembly of an internal body and LED panels of an LED nail dryer according to an embodiment. FIG. 10 is a perspective view illustrating the assembly of FIG. 9 as viewed from above the bottom thereof, according to an embodiment. FIG. 11 is a bottom view of the assembly of FIG. 9, according to an embodiment. FIG. 12 is a cross-sectional view taken along line B-B of FIG. 11, according to an embodiment. FIG. 13 is a cross-sectional view taken along line C-C of FIG. 11, according to an embodiment. FIG. 14 is a side view illustrating the assembly of FIG. 9, according to an embodiment. FIG. 15 is an exploded perspective view illustrating a first panel of an LED nail dryer according to an embodiment. FIG. 16 is an exploded perspective view illustrating a second panel of an LED nail dryer according to an embodiment. FIG. 17 is an exploded perspective view illustrating a third panel of an LED nail dryer according to an embodiment. FIG. 18 is an exploded perspective view illustrating a fourth panel of an LED nail dryer according to an embodiment. FIG. 19 is an exploded perspective view illustrating a fifth panel of an LED nail dryer according to an embodiment. FIG. 20 is an exploded perspective view illustrating a sixth panel of an LED nail dryer according to an embodiment. FIG. 21 is an exploded perspective view illustrating a seventh panel of an LED nail dryer according to an embodiment. FIG. 22 is an exploded perspective view illustrating an eighth panel of an LED nail dryer according to an embodiment.

According to an embodiment, referring to FIGS. 1 to 14, a light emitting diode (LED) nail dryer 10 may include a cover 100 having a front surface and a rear surface, the rear surface having a rear opening 101, a bottom plate 300 coupled with the cover 100 and having a bottom opening 301 extending to the rear opening 101, a plurality of LED panels 400 disposed in the bottom opening 301 of the bottom plate 300 to form an internal depressed space, and an internal body 200 formed on the bottom plate 300 in the cover 100.

The cover 100 may be shaped substantially like a block, e.g., a truncated square pyramid with each corner rounded. Ventilation holes 110 or heat-radiating holes 110 may be formed in two opposite sides of the cover 100 to discharge heat, dust or odors from inside the cover 100 to the outside. The ventilation holes 110 or heat-radiating holes 110 may be formed in an elongate slit shape along one row near the top of the cover 100. In the shown example, four ventilation holes 110 or heat-radiating holes 110 are formed in each side surface of the cover 100 but the number of the ventilation holes 110 or heat-radiating holes 110 is not limited thereto.

A control panel 120 may be attached onto the front surface of the cover 100.

The control panel 120 may include a display 121 and at least one control button 122. For example, the control panel 120 may include a plurality of control buttons 122, including, but not limited to, power on/off buttons, strength adjustment buttons, or LED brightness adjustment buttons.

The cover 100 may be provided to cover the internal body 200 and the bottom plate 300.

The internal body 200 is placed on the bottom plate 300 in the cover 100. The internal body 200 may be screwed to the bottom plate 300. The internal body 200 may be shaped as a vessel with an opening 201 in one side thereof. The opening 201 of the internal body 200 may be formed to correspond to the rear hole of the cover 100. The internal body 200 may be structured with a top part 210 and a plurality of, e.g., six, side parts 220. The side parts 220 of the internal body 200 may extend from the top part 210. The neighboring ones of the side parts 220 may be angled at a predetermined angle therebetween. One of the side parts 220 may have the opening 201. Each side part 220 may include a socket 230 that is covered by a corresponding LED panel 400. Each socket 230 may have at least one slots 231, e.g., for ventilation or heat-radiating purposes. At least one of the sockets 230 may have at least one magnet receiving part 233 on the bottom. For example, two magnet receiving parts 233 may be provided in each socket 230 of the side part 220. Magnets 232 may be seated, placed, or fitted on the magnet receiving parts 233. A socket board 235 may be provided to cover the magnets 232 and the bottom of each socket 230. The socket board 235 may pressingly cover the magnets 232. For example, the socket board 235 may be fastened to the bottom of the socket 230 via at least one screws. The sockets 230 may be arranged along the periphery of the bottom plate 300.

The sockets 230 may be arranged in a dome-shaped structure to form an internal space where the user places her hand to dry her finger nails. For example, the internal space may be formed by the rear opening 101 of the case 100, the opening 201 of the internal body 200, and the bottom opening 301 of the bottom plate 300.

Each socket 230 has a space to receive, or allow to be fitted thereto, its corresponding LED panel 400. Thus, The LED panel 400 may be fitted into its corresponding socket 230.

Each LED panel 400 may be fitted into—and cover—a respective one of the plurality of sockets 230 via a magnet 232 or a fitting structure (also referred to a fastening protrusion) 436. Each socket 230 may be sized or dimensioned or shaped to correspond to its corresponding LED panel 400.

According to an embodiment, the plurality of LED panels 400 may include eight LED panels 400 for illustration purposes. However, the number of LED panels 400 is not limited thereto and more or less LED panels 400 may be provided.

Each LED panel 400 may include an LED module casing 410 and an LED module board 420 to cover the LED module casing 410. The LED module board 420 may be fastened to the LED module casing 410 via, at least one, e.g., three, screws. The LED module casing 410 may have at least one mirror plate receiving hole 411 depressed from a first surface thereof and at least one supporting pole 412 and at least one screw pole 413 projecting from a second surface facing away from the first surface. For example, the LED module casing 410 may include two mirror plate receiving holes 411, two supporting poles 412, and three screw poles 413. Each mirror plate receiving hole 411 may receive a corresponding mirror plate 415 that is light-reflective. A attaching screw 416 may be inserted into each supporting pole 412, and a fastening screw 417 may be inserted into each screw pole 413. The LED module casing 410 may further include, at least one, e.g., two, fastening protrusions 436 at the top. The fastening protrusions 436 of the LED module casing 410 may be stuck or fitted to slots 236 formed in the socket 230. Each LED panel 400 may be detachably and stably fit and positioned in place into the corresponding socket 230 by the magnets 232 and the fastening protrusions 436.

The attaching screws 416 inserted into the supporting poles 412 may be formed of metal and stick to the magnets 232 provided in the socket 230 when the LED panel 400 fits the socket 230.

The fastening screws 417 may affix the LED module board 420 to the LED module casing 410.

The LED panels 400 are described below in greater detail.

An example in which the LED nail dryer 10 includes eight LED panels 400 is described below for ease of description. However, it should be noted that embodiments of the disclosure are not limited thereto.

FIG. 15 illustrates a first LED panel 400 which may be disposed in a corresponding socket 230 of an internal body 200 of an LED nail dryer 10 according to an embodiment.

Referring to FIG. 15, the first LED panel 400 may include an LED module casing 410 and an LED module board 420. The LED module casing 410 may include two concave mirror plates 415. At least one light emitting diode (LED) 450 may be disposed in a center of each concave mirror plate 415. The concave mirror plate 415 may be formed in a cone or truncated cone shape and has reflectivity to reflect out light emitted from the LED 450.

The first LED panel 400 may include an LED module casing 410 in which at least one hole (e.g., the above-described mirror plate receiving hole 411) for inserting at least concave mirror plate 415 is formed and one or more projection poles (e.g., including the supporting poles 412 and the screw poles 413) formed on the rear surface of the LED module casing 410.

For example, the LED module casing 410 of the first LED panel 400 may include a substantially round-cornered trapezoidal top plate and a bottom plate extending from the top plate. The top plate and the support plate of the LED module casing 410 together may form a substantially L-shape at side view. The angle between the top and bottom plates of the LED module casing 410 may be an obtuse angle.

One or more, e.g., two, fastening protrusions 436 may be formed at the top side of the top plate of the LED module casing 410 to allow the first LED panel 400 to fasten to its corresponding socket 230.

The LED module board 420 is connected with a connector 460 via lead lines 461. The connector 460 may be fitted into a slot formed in the socket 230 to supply external power, e.g., from an outlet, to the LED 450.

An enclosing wall 418 may be formed on the back surface of the LED module casing 410 to surround, e.g., the screw poles 413.

The projection poles are formed to project upwards from the back surface of the LED module casing 410. The projection poles may include two supporting poles 412 and three screw poles 413. Metallic screws 416 (e.g., the above-described attaching screws 416) may be inserted into the supporting poles 412 and, when the LED panel 400 fits its corresponding socket 230, stick to the magnets 232, allowing the LED panel 400 to easily fit in place to or remove from the socket 230. Screws (e.g., the above-described fastening screws 417) may be inserted through the LED module board 420 and the screw poles 413 to firmly fasten the LED module board 420 to the LED module casing 410.

Although five projection poles, e.g., two supporting poles 412 and three screw poles 413, are shown in FIG. 15, embodiments of the disclosure are not limited thereto. Although two fastening protrusions 436 are shown, embodiments of the disclosure are not limited thereto.

The LED module casing 410 may have at least one dome-shaped recess (e.g., the above-described mirror plate receiving hole 411) to receive a concave mirror plate 415.

An LED 450 or other lamp may be fitted through a center hole of each concave mirror plate 415 and be connected to the lead lines 461 to receive power via the connector 460.

The user may remove the first LED panel 400 from the socket 230 by holding and lifting up the first LED panel 400. The user may fit the first LED panel 400 into the socket 230 by placing the protrusions in the slots 236 of the socket 230 and gently pushing the first LED panel 400 down. When placing the first LED panel 400 on the corresponding socket 230, the first LED panel 400 may be led to the socket 230 by the attraction between the magnets 232 formed in the socket 230 and the metallic screws 416 formed in the LED module casing 410, so that the first LED panel 400 may be fitted, securely and in place, into the socket 230. As such, the presence of the fastening protrusions 436 and the magnets 232 allows for an easier replacing or exchanging of the LED panel 400.

FIG. 16 illustrates a second LED panel 400 which may be disposed in a corresponding socket 230 of an internal body 200 of an LED nail dryer 10 according to an embodiment.

Referring to FIG. 16, the second LED panel 400 may include two concave mirror plates 415. At least one LED 450 may be disposed in a center of each concave mirror plate 415. The concave mirror plate 415 may be formed in a cone or truncated cone shape and has reflectivity to reflect out light emitted from the LED 450.

The second LED panel 400 may include an LED module casing 410 in which at least one hole (e.g., the above-described mirror plate receiving hole 411) for inserting at least concave mirror plate 415 is formed and one or more projection poles (e.g., including the supporting poles 412 and the screw poles 413) formed on the rear surface of the LED module casing 410.

For example, the LED module casing 410 of the second LED panel 400 may include a substantially round-cornered trapezoidal top plate and a bottom plate extending from the top plate. The top plate and the support plate of the LED module casing 410 together may form a substantially L-shape at side view. The angle between the top and bottom plates of the LED module casing 410 may be an obtuse angle.

One or more, e.g., two, fastening protrusions 436 may be formed at the top side of the second LED panel 400 to allow the second LED panel 400 to fasten to its corresponding socket 230.

The LED module board 420 is connected with a connector 460 via lead lines 461. The connector 460 may be fitted into a slot formed in the socket 230 to supply external power, e.g., from an outlet, to the LED 450.

An enclosing wall 418 may be formed on the back surface of the LED module casing 410 to surround, e.g., the screw poles 413.

The projection poles are formed to project upwards from the back surface of the LED module casing 410. The projection poles may include two supporting poles 412 and three screw poles 413. Metallic screws 416 (e.g., the above-described attaching screws 416) may be inserted into the supporting poles 412 and, when the LED panel 400 fits its corresponding socket 230, stick to the magnets 232, allowing the LED panel 400 to easily fit in place to or remove from the socket 230. Screws (e.g., the above-described fastening screws 417) may be inserted through the LED module board 420 and the screw poles 413 to firmly fasten the LED module board 420 to the LED module casing 410.

Although four projection poles, e.g., two supporting poles 412 and two screw poles 413, are shown in FIG. 16, embodiments of the disclosure are not limited thereto. Although two fastening protrusions 436 are shown, embodiments of the disclosure are not limited thereto.

The LED module casing 410 may have at least one dome-shaped recess (e.g., the above-described mirror plate receiving hole 411) to receive a concave mirror plate 415.

An LED 450 or other lamp may be fitted through a center hole of each concave mirror plate 415 and be connected to the lead lines 461 to receive power via the connector 460.

The user may remove the second LED panel 400 from the socket 230 by holding and lifting up the first LED panel 400. The user may fit the second LED panel 400 into the socket 230 by placing the protrusions in the slots 236 of the socket 230 and gently pushing the second LED panel 400 down. When placing the second LED panel 400 on the corresponding socket 230, the second LED panel 400 may be led to the socket 230 by the attraction between the magnets 232 formed in the socket 230 and the metallic screws 416 formed in the LED module casing 410, so that the second LED panel 400 may be fitted, securely and in place, into the socket 230.

As such, the presence of the fastening protrusions 436 and the magnets 232 allows for an easier replacing or exchanging of the LED panel 400.

FIG. 17 illustrates a third LED panel 400 which may be disposed in a corresponding socket 230 of an internal body 200 of an LED nail dryer 10 according to an embodiment.

Referring to FIG. 17, the third LED panel 400 may include two concave mirror plates 415. At least one LED 450 may be disposed in a center of each concave mirror plate 415. One of the concave mirror plates 415 may be formed in a cone or truncated cone shape and has reflectivity to reflect out light emitted from the LED 450, and the other of the concave mirror plates 415 may be formed in an elliptical dome shape with a light-reflecting inner surface. The LED module casing 410 of the third LED panel 400 may have a sensor hole 401 where a sensor (not shown) is placed. The sensor (not shown) may detect the placement of the user's hand in the internal space in the LED nail dryer 10.

The third LED panel 400 may include an LED module casing 410 in which at least one hole (e.g., the above-described mirror plate receiving hole 411) for inserting at least concave mirror plate 415 is formed and one or more projection poles (e.g., including the supporting poles 412 and the screw poles 413) formed on the rear surface of the LED module casing 410.

For example, the LED module casing 410 may have two portions, e.g., a first portion and a second portion. The first portion and the second portion of the LED module casing 410 may be angled with respect to each other. A regular dome-shaped concave mirror plate 415 may be formed in the first portion of the LED module casing 410, and an elliptical dome-shaped concave mirror plate 415 may be formed in the second portion of the LED module casing 410. The second portion of the LED module casing 410 may have a substantially U-shaped hole. For example, an LED 450 or other lamp may be fitted in the center of the regular dome-shaped concave mirror plate 415, and two LEDs 450 or lamps may be fitted in the center of the elliptical dome-shaped concave mirror plate 415.

For example, the LED module casing 410 of the third LED panel 400 may include a top plate and a bottom plate extending from the top plate. The top and bottom plates of the LED module casing 410 together may form a substantially L-shape at side view. The angle between the top and bottom plates of the LED module casing 410 may be an obtuse angle.

One or more, e.g., two, fastening protrusions 436 may be formed at the top side of the top plate of the third LED panel 400 to allow the third LED panel 400 to fasten to its corresponding socket 230. For example, one of the fastening protrusions 436 may be formed at the top of the first portion of the LED module casing 410, and the other of the fastening protrusions 436 may be formed at the top of the second portion of the LED module casing 410.

The LED module board 420 is connected with a connector 460 via lead lines 461. The connector 460 may be fitted into a slot formed in the socket 230 to supply external power, e.g., from an outlet, to the LED 450.

An enclosing wall 418 may be formed on the back surface of the LED module casing 410 to surround, e.g., the screw poles 413.

The projection poles are formed to project upwards from the back surface of the LED module casing 410. The projection poles may include two supporting poles 412 and three screw poles 413. Metallic screws 416 (e.g., the above-described attaching screws 416) may be inserted into the supporting poles 412 and, when the LED panel 400 fits its corresponding socket 230, stick to the magnets 232, allowing the LED panel 400 to easily fit in place to or remove from the socket 230. Screws (e.g., the above-described fastening screws 417) may be inserted through the LED module board 420 and the screw poles 413 to firmly fasten the LED module board 420 to the LED module casing 410.

Although six projection poles (e.g., two supporting poles 412 and four screw poles 413) are shown in FIG. 17, embodiments of the disclosure are not limited thereto. Although two fastening protrusions 436 are shown, embodiments of the disclosure are not limited thereto.

The LED module casing 410 may have at least one dome-shaped recess (e.g., the above-described mirror plate receiving hole 411) to receive a concave mirror plate 415.

An LED 450 or other lamp may be fitted through a center hole of each concave mirror plate 415 and be connected to the lead lines 461 to receive power via the connector 460.

The user may remove the third LED panel 400 from the socket 230 by holding and lifting up the third LED panel 400. The user may fit the third LED panel 400 into the socket 230 by placing the protrusions in the slots 236 of the socket 230 and gently pushing the third LED panel 400 down. When placing the third LED panel 400 on the corresponding socket 230, the third LED panel 400 may be led to the socket 230 by the attraction between the magnets 232 formed in the socket 230 and the metallic screws 416 formed in the LED module casing 410, so that the third LED panel 400 may be fitted, securely and in place, into the socket 230.

As such, the presence of the fastening protrusions 436 and the magnets 232 allows for an easier replacing or exchanging of the LED panel 400.

FIG. 18 illustrates a fourth LED panel 400 which may be disposed in a corresponding socket 230 of an internal body 200 of an LED nail dryer 10 according to an embodiment.

Referring to FIG. 18, the fourth LED panel 400 may include an LED module casing 410 and an LED module board 420. The LED module casing 410 may include two concave mirror plates 415. At least one LED 450 may be disposed in a center of each concave mirror plate 415. The concave mirror plate 415 may be formed in a cone or truncated cone shape and has reflectivity to reflect out light emitted from the LED 450.

The fourth LED panel 400 may include an LED module casing 410 in which at least one hole (e.g., the above-described mirror plate receiving hole 411) for inserting at least concave mirror plate 415 is formed and one or more projection poles (e.g., including the supporting poles 412 and the screw poles 413) formed on the rear surface of the LED module casing 410. The fourth LED panel 400 may be longer horizontally than the first LED panel 400 or second LED panel 400.

For example, the LED module casing 410 of the fourth LED panel 400 may include a substantially round-cornered trapezoidal top plate and a bottom plate extending from the top plate. The top plate and the support plate of the LED module casing 410 together may form a substantially L-shape at side view. The angle between the top and bottom plates of the LED module casing 410 may be an obtuse angle.

One or more, e.g., two, fastening protrusions 436 may be formed at the top side of the fourth LED panel 400 to allow the fourth LED panel 400 to fasten to its corresponding socket 230.

The LED module board 420 is connected with a connector 460 via lead lines 461. The connector 460 may be fitted into a slot formed in the socket 230 to supply external power, e.g., from an outlet, to the LED 450.

An enclosing wall 418 may be formed on the back surface of the LED module casing 410 to surround, e.g., the screw poles 413.

The projection poles are formed to project upwards from the back surface of the LED module casing 410. The projection poles may include two supporting poles 412 and three screw poles 413. Metallic screws 416 (e.g., the above-described attaching screws 416) may be inserted into the supporting poles 412 and, when the LED panel 400 fits its corresponding socket 230, stick to the magnets 232, allowing the LED panel 400 to easily fit in place to or remove from the socket 230. Screws (e.g., the above-described fastening screws 417) may be inserted through the LED module board 420 and the screw poles 413 to firmly fasten the LED module board 420 to the LED module casing 410.

Although two fastening protrusions 436 are shown in FIG. 18, embodiments of the disclosure are not limited thereto.

The LED module casing 410 may have at least one dome-shaped recess (e.g., the above-described mirror plate receiving hole 411) to receive a concave mirror plate 415.

An LED 450 or other lamp may be fitted through a center hole of each concave mirror plate 415 and be connected to the lead lines 461 to receive power via the connector 460.

The user may remove the fourth LED panel 400 from the socket 230 by holding and lifting up the fourth LED panel 400. The user may fit the fourth LED panel 400 into the socket 230 by placing the protrusions in the slots 236 of the socket 230 and gently pushing the fourth LED panel 400 down. When placing the fourth LED panel 400 on the corresponding socket 230, the fourth LED panel 400 may be led to the socket 230 by the attraction between the magnets 232 formed in the socket 230 and the metallic screws 416 formed in the LED module casing 410, so that the fourth LED panel 400 may be fitted, securely and in place, into the socket 230. As such, the presence of the fastening protrusions 436 and the magnets 232 allows for an easier replacing or exchanging of the LED panel 400.

FIG. 19 illustrates a fifth LED panel 400 which may be disposed in a corresponding socket 230 of an internal body 200 of an LED nail dryer 10 according to an embodiment.

Referring to FIG. 19, the fifth LED panel 400 may be substantially symmetrical in structure with the third LED panel 400 and may have a substantially the same structure as the third LED panel 400.

FIG. 20 illustrates a sixth LED panel 400 which may be disposed in a corresponding socket 230 of an internal body 200 of an LED nail dryer 10 according to an embodiment.

Referring to FIG. 20, the sixth LED panel 400 may be substantially symmetrical in structure with the second LED panel 400 and may have a substantially the same structure as the second LED panel 400.

FIG. 21 illustrates a seventh LED panel 400 which may be disposed in a corresponding socket 230 of an internal body 200 of an LED nail dryer 10 according to an embodiment.

Referring to FIG. 21, the seventh LED panel 400 may include an LED module casing 410 and an LED module board 420. The LED module casing 410 may include two concave mirror plates 415. At least one LED 450 may be disposed in a center of each concave mirror plate 415. The concave mirror plate 415 may be formed in a cone or truncated cone shape and has reflectivity to reflect out light emitted from the LED 450.

The seventh LED panel 400 may include an LED module casing 410 in which at least one hole (e.g., the above-described mirror plate receiving hole 411) for inserting at least concave mirror plate 415 is formed and one or more projection poles (e.g., including the supporting poles 412 and the screw poles 413) formed on the rear surface of the LED module casing 410.

For example, the LED module casing 410 of the seventh LED panel 400 may include a substantially round-cornered trapezoidal top plate and a bottom plate extending from the top plate. The top plate and the support plate of the LED module casing 410 together may form a substantially L-shape at side view. The angle between the top and bottom plates of the LED module casing 410 may be an obtuse angle.

One or more, e.g., two, fastening protrusions 436 may be formed at the top side of the seventh LED panel 400 to allow the seventh LED panel 400 to fasten to its corresponding socket 230.

The LED module board 420 is connected with a connector 460 via lead lines 461. The connector 460 may be fitted into a slot formed in the socket 230 to supply external power, e.g., from an outlet, to the LED 450.

An enclosing wall 418 may be formed on the back surface of the LED module casing 410 to surround, e.g., the screw poles 413.

The projection poles are formed to project upwards from the back surface of the LED module casing 410. The projection poles may include two supporting poles 412 and three screw poles 413. Metallic screws 416 (e.g., the above-described attaching screws 416) may be inserted into the supporting poles 412 and, when the LED panel 400 fits its corresponding socket 230, stick to the magnets 232, allowing the LED panel 400 to easily fit in place to or remove from the socket 230. Screws (e.g., the above-described fastening screws 417) may be inserted through the LED module board 420 and the screw poles 413 to firmly fasten the LED module board 420 to the LED module casing 410.

Although four projection poles, e.g., two supporting poles 412 and two screw poles 413, are shown, embodiments of the disclosure are not limited thereto. Although two fastening protrusions 436 are shown, embodiments of the disclosure are not limited thereto.

The LED module casing 410 may have at least one dome-shaped recess (e.g., the above-described mirror plate receiving hole 411) to receive a concave mirror plate 415.

An LED 450 or other lamp may be fitted through a center hole of each concave mirror plate 415 and be connected to the lead lines 461 to receive power via the connector 460.

The user may remove the seventh LED panel 400 from the socket 230 by holding and lifting up the seventh LED panel 400. The user may fit the seventh LED panel 400 into the socket 230 by placing the protrusions in the slots 236 of the socket 230 and gently pushing the seventh LED panel 400 down. When placing the seventh LED panel 400 on the corresponding socket 230, the seventh LED panel 400 may be led to the socket 230 by the attraction between the magnets 232 formed in the socket 230 and the metallic screws 416 formed in the LED module casing 410, so that the seventh LED panel 400 may be fitted, securely and in place, into the socket 230. As such, the presence of the fastening protrusions 436 and the magnets 232 allows for an easier replacing or exchanging of the LED panel 400.

FIG. 22 illustrates an eighth LED panel 400 which may be disposed in a corresponding socket 230 of an internal body 200 of an LED nail dryer 10 according to an embodiment.

Referring to FIG. 22, the eighth LED panel 400 may be substantially symmetrical in structure with the seventh LED panel 400 and may have a substantially the same structure as the seventh LED panel 400.

Figure 23:
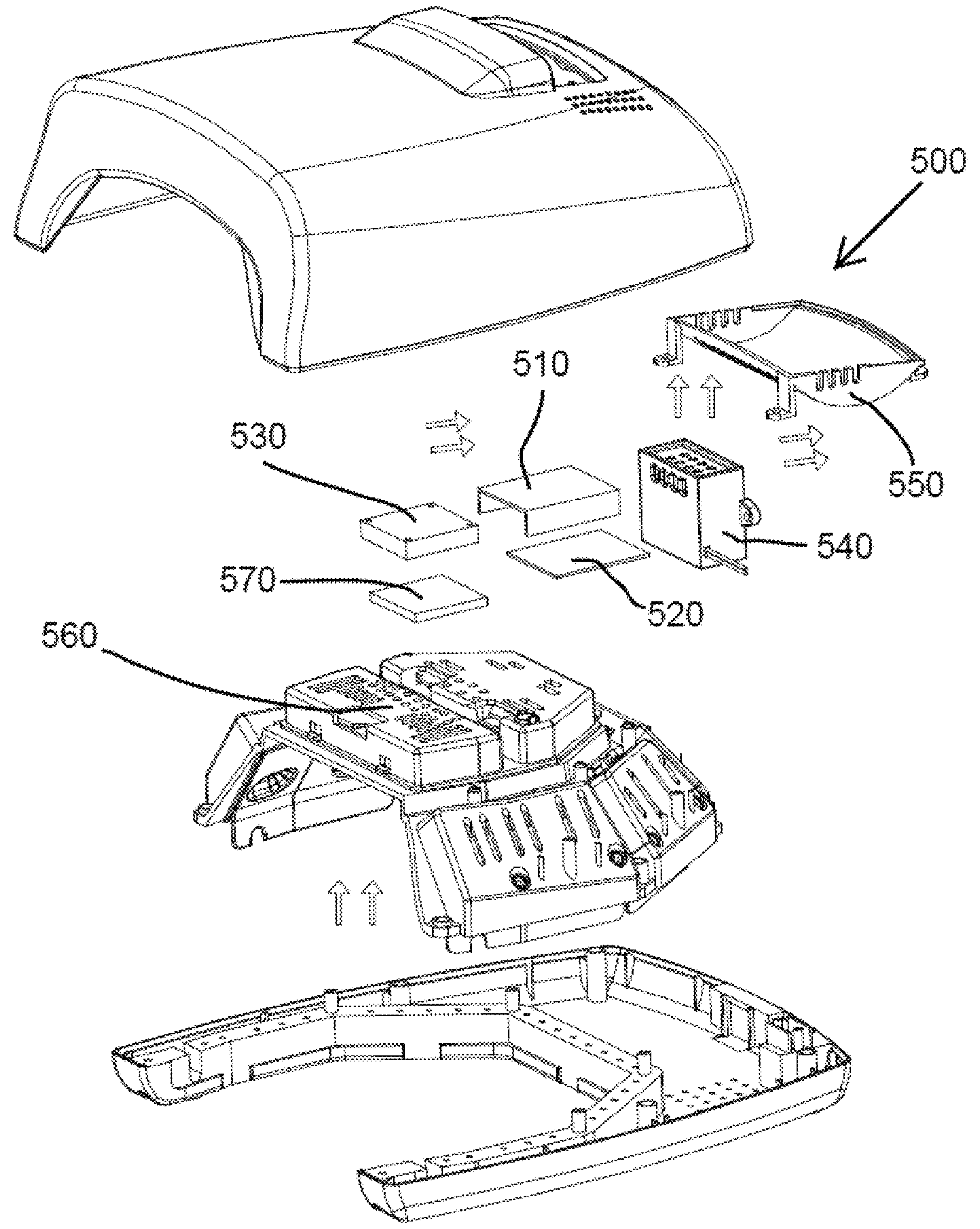
FIG. 23 is an exploded perspective view illustrating an LED nail dryer according to an embodiment.

FIG. 23 is an exploded perspective view illustrating an LED nail dryer with an ion plasma purifier 500, according to an embodiment.

Figure 24A:
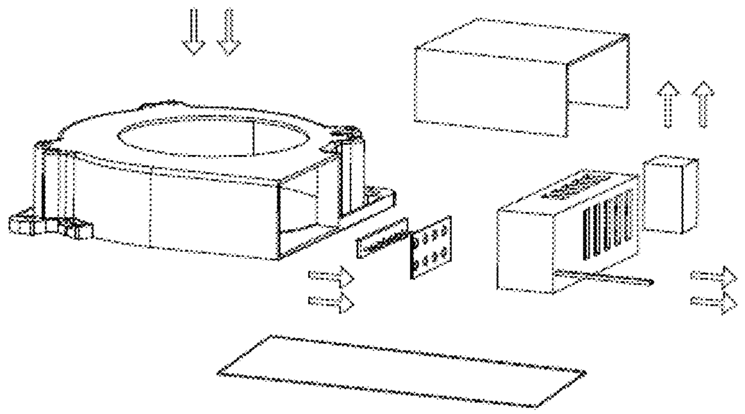
FIGS. 24A, 24B, and 24C are perspective views illustrating three different types of ion plasma purifiers as used in an LED nail dryer, according to an embodiment of the present invention.
Figure 24B:
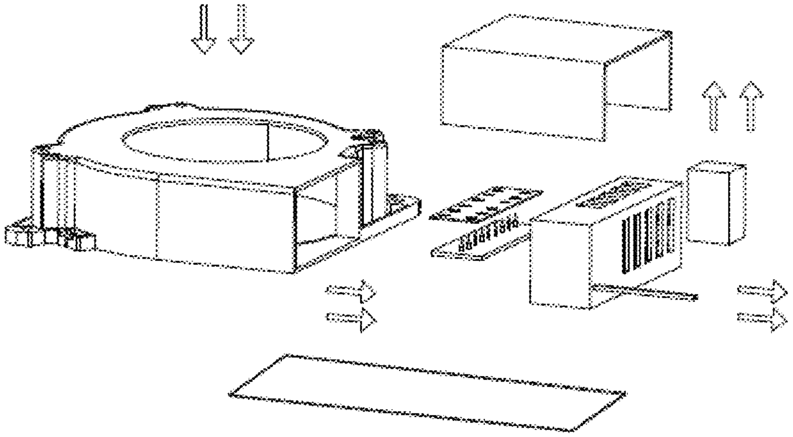
Figure 24C:
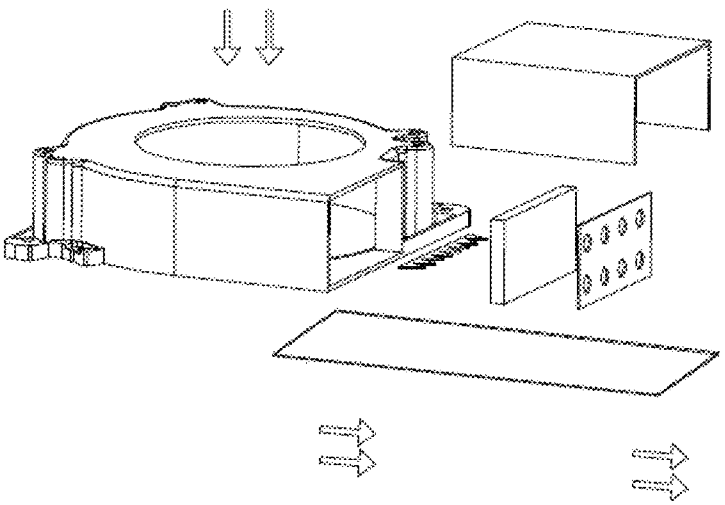

FIGS. 24A, 24B, and 24C are perspective views illustrating three different types of ion plasma purifiers as used in an LED nail dryer, according to an embodiment of the present invention.

Figure 25:
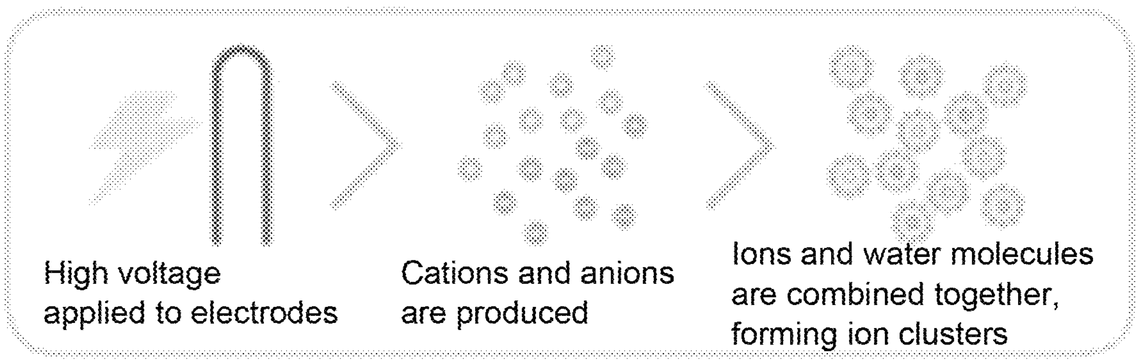
FIG. 25 is a view illustrating an example of purifying contaminated air using an ion plasma purifier included in an LED nail dryer, according to an embodiment of the present invention.

FIG. 25 is a view illustrating an example of purifying contaminated air using an ion plasma purifier included in an LED nail dryer, according to an embodiment of the present invention.

Referring to FIG. 23, an LED nail dryer 10 as described above in connection with FIGS. 1 to 22 may further include an ion plasma purifier 500.

The ion plasma purifier 500 may be provided in various types as shown in FIGS. 24A, 24B, and 24C. An example type of ion plasma purifier 500 is described below in connection with FIG. 23 for illustration purposes, but without limited thereto, the operational principle thereof may also be applicable to other types of ion plasma purifiers.

The ion plasma purifier 500 may include an upper duct cover 510, a lower duct cover 520, a blower 530, an ion plasma module 540, and a ventilation casing 550.

The upper duct cover 510 and the lower duct cover 520 may together form a duct through which the air is discharged from the inside of the LED nail dryer 10 to the outside.

The blower 530 may have a fan inside. The duct formed by the upper duct cover 510 and the lower duct cover 520 may be coupled to the blower 530. The blower 530 may suck in the air inside the LED dryer and discharge the sucked air to the outside through the duct. Further, the blower 530 may cool down the air inside the LED The ion plasma module 540 may be a small ion plasma generator. The ion plasma module 540 may be connected to a side of the duct. The ion plasma module 540 may include ion plasma electrodes thereinside. The contaminated air inside the LED nail dryer 10 may be changed in its molecular property and purified while passing by the ion plasma electrodes in the ion plasma module 540, and the purified air may be discharged through the ventilation casing 550. The ion plasma electrodes of the ion plasma module 540 may include at least one positive electrode and at least one negative electrode. The negative electrode may be formed in a web structure, and the negative electrode may be formed in a multi-needle structure. The ion plasma module 540 may further include a transformer to convert direct current (DC) voltage into a high alternating current (AC) voltage.

The ventilation casing 550 may be placed on and connected to the ion plasma module 540.

A top portion of the internal body 200 may have a plurality of through holes 560. The blower 530 may be placed on the top portion of the internal body 200 to cover the through holes 560.

When the user puts her fingers in the inner space of the LED nail dryer 10 and operates the LED nail dryer 10, dust or odors may be created. The air contaminated with dust and odors to the duct is sucked up to the duct by the blower 530 and is then forced to flow through the duct to the ion plasma module 540. Thereafter, while passing through the ion plasma module 540, the contaminated air is purified and is then discharged through the ventilation casing 550 to the outside.

According to an embodiment of the present invention, an air filter 570 (e.g., a carbon filter or a high-efficiency particulate air (HEPA) filter) may be added ahead of (e.g., at the inlet of) the ion plasma purifier 500 to provide cleaner and more fresh air. In this case, the air filter 570 may first purify the air coming from the inside of the LED nail dryer 10 and the ion plasma module 540 may secondly purify the air.

The principle of air purification is described with reference to FIG. 25.

A high voltage is applied to the electrodes in the plasma module 540, producing cations and anions. The cations and anions are combined with water molecules in the air, forming ion clusters. For example, gaseous materials or particles in the contaminated air, which may be positive ions may be combined with negative ions produced by a corona discharge in the plasma module 540 as a high voltage is applied to the electrodes and be neutralized and filtered out.

Although the disclosure has been shown and described in connection with exemplary embodiments thereof, it will be appreciated by one of ordinary skill in the art that various changes or modifications may be made thereto without departing from the scope of the disclosure.

What is claimed is:

1. A light emitting diode (LED) nail dryer, comprising:

a cover having a front surface and a rear surface, the rear surface having a rear opening;

a bottom plate coupled with the cover and having a bottom opening extending to the rear opening;

an internal body formed on the bottom plate in the cover and having a plurality of sockets; and a plurality of LED panels, wherein the plurality of sockets of the internal body are arranged in a dome shape, and wherein each of the plurality of LED panels is detachably fitted into a respective one of the plurality of sockets via at least one magnet.

2. The LED nail dryer of claim 1, wherein a control panel is attached onto the front surface of the cover.

3. The LED nail dryer of claim 2, wherein the control panel includes a display and at least one control button.

4. The LED nail dryer of claim 3, wherein each of the plurality of LED panels has at least one concave mirror plate, and wherein at least one LED is disposed in a center of each concave mirror plate.

5. The LED nail dryer of claim 1, wherein the internal body includes a top part and a plurality of side parts extending from the top part, wherein one of the side parts includes an opening corresponding to the rear opening of the cover, and wherein the plurality of sockets are formed in the plurality of side parts.

6. The LED nail dryer of claim 5, wherein each of the plurality of sockets includes at least one slots.

7. The LED nail dryer of claim 1, wherein each of the plurality of sockets has a space to receive, or allow to be fitted thereto, a corresponding one of the plurality of LED panels.

8. The LED nail dryer of claim 1, wherein each of the plurality of sockets is sized, dimensioned, or shaped to correspond to a corresponding one of the plurality of LED panels.

9. The LED nail dryer of claim 1, wherein each of the plurality of LED panels includes an LED module casing and an LED module board configured to cover the LED module casing.

10. The LED nail dryer of claim 9, wherein the LED module board is fastened to the LED module casing via at least one screw, wherein the LED module casing includes at least one mirror plate receiving hole depressed from a first surface thereof and at least one supporting pole and at least one screw pole projecting from a second surface facing away from the first surface.

11. The LED nail dryer of claim 10, wherein an attaching screw is inserted into each of the at least one supporting pole, and a fastening screw is inserted into each of the at least one screw pole, and wherein the attaching screw sticks to a corresponding one of the at least one magnet.

12. The LED nail dryer of claim 11, further comprising at least one fitting structure including a fastening protrusion from a top of the LED module casing fitted and stuck to a slot formed in each of the plurality of sockets.

13. The LED nail dryer of claim 12, wherein the fastening screw connects the LED module board to the LED module casing.

14. A light emitting diode (LED) nail dryer, comprising:

a cover having a front surface and a rear surface, the rear surface having a rear opening;

a bottom plate coupled with the cover and having a bottom opening extending to the rear opening;

an internal body formed on the bottom plate in the cover and having a plurality of sockets; and a plurality of LED panels, wherein the plurality of sockets of the internal body are arranged in a dome shape, and wherein each of the plurality of LED panels is detachably fitted into a respective one of the plurality of sockets via at least one magnet, wherein at least one of the plurality of sockets includes at least one magnet receiving part on a bottom thereof and the at least one magnet seated on the at least one magnet receiving part, and wherein a socket board is provided to cover the at least one magnet and is fastened to the bottom of the at least one socket via at least one screw.

* * * * *